(12) United States Patent
Koyanagi

(10) Patent No.: US 11,755,035 B2
(45) Date of Patent: Sep. 12, 2023

(54) UNMANNED AERIAL VEHICLE CONTROL SYSTEM AND UNMANNED AERIAL VEHICLE CONTROL METHOD

(71) Applicant: Yamaha Hatsudoki Kabushiki Kaisha, Shizuoka (JP)

(72) Inventor: Tomoyoshi Koyanagi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 188 days.

(21) Appl. No.: 17/388,026

(22) Filed: Jul. 29, 2021

(65) Prior Publication Data

US 2022/0100207 A1 Mar. 31, 2022

(30) Foreign Application Priority Data

Aug. 5, 2020 (JP) .................. 2020-133345

(51) Int. Cl.
| | |
|---|---|
| G05D 1/00 | (2006.01) |
| B64C 39/02 | (2023.01) |
| B60L 53/18 | (2019.01) |
| G01S 19/14 | (2010.01) |
| G05D 1/04 | (2006.01) |
| H02J 7/00 | (2006.01) |

(52) U.S. Cl.
CPC ............. *G05D 1/042* (2013.01); *B60L 53/18* (2019.02); *B64C 39/024* (2013.01); *G01S 19/14* (2013.01); *B60L 2200/10* (2013.01); *H02J 7/0042* (2013.01)

(58) Field of Classification Search
CPC ........ G05D 1/042; G05D 1/0866; G05D 1/00; B60L 53/18; B60L 2200/10; B64C 39/024; B64C 39/022; B64C 39/02; G01S 19/14; G01S 5/16; G01S 19/49; H02J 7/0042; H02J 7/342; H02J 2310/44; B64U 2101/30; B64U 10/13; B64U 50/19; B64U 2201/202; B64U 80/84; Y02T 10/70; Y02T 10/7072; Y02T 90/14; B64F 3/02

See application file for complete search history.

(56) References Cited

U.S. PATENT DOCUMENTS

| | | | | |
|---|---|---|---|---|
| 2010/0013226 | A1* | 1/2010 | Blumer | ..................... F03D 5/00 290/55 |
| 2018/0050800 | A1* | 2/2018 | Boykin | .............. G08B 13/1966 |
| 2021/0140934 | A1* | 5/2021 | Smith | .................. G05D 1/0094 |
| 2021/0253241 | A1* | 8/2021 | Haran | .................. B64C 39/022 |
| 2022/0150719 | A1* | 5/2022 | Park | ....................... H04W 16/28 |
| 2022/0371729 | A1* | 11/2022 | Saikin | ..................... B64D 1/02 |
| 2022/0410728 | A1* | 12/2022 | Marquez | ............. H01M 16/006 |

FOREIGN PATENT DOCUMENTS

| | | |
|---|---|---|
| JP | 2016199144 A | 12/2016 |
| JP | 2017217942 A | 12/2017 |
| WO | WO-2022074643 A1 * | 4/2022 |

* cited by examiner

*Primary Examiner* — Yonel Beaulieu
(74) *Attorney, Agent, or Firm* — HEA LAW PLLC

(57) ABSTRACT

A control system includes a base device to be mounted on a mobile object, an aerial vehicle, a cable including a power supply cable for supplying electric power from the mobile object to the aerial vehicle and connecting the base device with the aerial vehicle, and a control device that controls flight of the aerial vehicle. The control device controls the aerial vehicle so that a relative altitude of the aerial vehicle with respect to the mobile object matches a target relative altitude. This control system optimizes an altitude of the aerial vehicle in accordance with the mobile object.

14 Claims, 15 Drawing Sheets

UNMANNED AERIAL VEHICLE CONTROL SYSTEM AND UNMANNED AERIAL VEHICLE CONTROL METHOD

CROSS-REFERENCE TO RELATED APPLICATION

The present application claims priority from Japanese application JP2020-133345 filed on Aug. 5, 2020, the content of which is hereby incorporated by reference into this application.

Field of the Invention

The present disclosure relates to an unmanned aerial vehicle control system and an unmanned aerial vehicle control method.

BACKGROUND OF THE INVENTION

Description of the Related Art

It is known to use an unmanned aerial vehicle equipped with a camera and capable of capturing aerial images of the ground or the sea. JP2017-217942A discloses an unmanned aerial vehicle connected to a mobile object (vehicle or ship) through a cable and supplied with electric power through the cable. JP2016-199144A discloses an unmanned aerial vehicle connected to an unmanned vehicle through a cable and supplied with electric power through the cable. Such unmanned aerial vehicles can fly for a long time regardless of a capacity of a battery.

If a mobile object is a boat, the mobile object receives water waves and the position of the mobile object moves up and down. It may sometimes be desirable for the aerial vehicle to move up and down in accordance with the movement of the mobile object. For example, when the relative altitude between the mobile object and the aerial vehicle is fixed, an image acquired by the camera of the aerial vehicle may be easily used for operating the mobile object. Further, the position of the aerial vehicle is required to move up and down in accordance with the movement of the mobile object so as to prevent an excessive load from acting on the aerial vehicle from the cable. This is also the case where the mobile object is a vehicle traveling on land.

SUMMARY OF THE INVENTION (1) An example of an unmanned aerial vehicle control system proposed in the present disclosure includes a base device to be mounted on a mobile object, an unmanned aerial vehicle, at least one cable including a power supply cable connecting the base device with the unmanned aerial vehicle, the power supply cable supplying electric power from the mobile object to the unmanned aerial vehicle, and a control device that controls flight of the unmanned aerial vehicle. The control device controls the unmanned aerial vehicle so that a relative altitude of the unmanned aerial vehicle with respect to the mobile object matches a target relative altitude. This control system optimizes an altitude of the unmanned aerial vehicle in accordance with the mobile object. For example, the altitude of the unmanned aerial vehicle can be moved up and down in accordance with the movement of the mobile object.

(2) The control system in (1) may include a sensor that detects an angle of the at least one cable. The control device may calculate the relative altitude of the unmanned aerial vehicle with respect to the mobile object based on the angle of the at least one cable.

(3) The control system in (1) may include a sensor that detects tension of the at least one cable. In a case where the tension of the at least one cable is lower than a threshold value, the control device may control the unmanned aerial vehicle so as to increase a distance between the unmanned aerial vehicle and the base device. This system reduces deflection of the cable and improves calculation accuracy of the relative altitude.

(4) In the control system in (1), the control device may include a relative altitude calculating unit that calculates the relative altitude of the unmanned aerial vehicle with respect to the mobile object, and control the unmanned aerial vehicle so that the calculated relative altitude matches the target relative altitude.

(5) The control system in (1) may include a camera that is mounted on one of the mobile object or the unmanned aerial vehicle so as to capture the other of the mobile object or unmanned aerial vehicle. The control device may use an image captured by the camera to calculate the relative altitude of the unmanned aerial vehicle with respect to the mobile object.

(6) The control system in (1) includes a first GPS receiver mounted on the mobile object and a second GPS receiver mounted on the unmanned aerial vehicle. The control device uses an altitude of the mobile object obtained from an output of the first GPS receiver and an altitude of the unmanned aerial vehicle obtained from an output of the second GPS receiver to control the unmanned aerial vehicle so that the relative altitude of the unmanned aerial vehicle with respect to the mobile object matches the target relative altitude.

(7) The control system in (6) may include an inertial measurement unit mounted on the mobile object. The control device may calculate the altitude of the mobile object based on a signal obtained by the first GPS receiver and an output of the inertial measurement unit. This enables the altitude of the mobile object to be detected with high accuracy, thereby improving the accuracy of control of the unmanned aerial vehicle.

(8) In the control system in (7), the control device may calculate the altitude of the mobile object based on the output of the inertial measurement unit during a period between a first time at which the first GPS receiver obtains a first signal and a second time at which the first GPS receiver obtains a second signal, the second signal being the next signal after the first signal.

(9) The control system in (1) may include a first barometric altitude sensor mounted on the mobile object and a second barometric altitude sensor mounted on the unmanned aerial vehicle. The control device may use an altitude of the mobile object calculated from an output of the first barometric altitude sensor and an altitude of the unmanned aerial vehicle calculated from an output of the second barometric altitude sensor to control the unmanned aerial vehicle so that the relative altitude of the unmanned aerial vehicle with respect to the mobile object matches the target relative altitude. This improves the accuracy of the control of the unmanned aerial vehicle.

(10) In the control system in (1), the control device includes a mobile object altitude calculating unit that calculates a current altitude of the mobile object and an aerial vehicle target altitude calculating unit that calculates a target altitude of the unmanned aerial vehicle based on the current position of the mobile object and the target relative altitude, and controls the unmanned aerial vehicle so that a current altitude of the unmanned aerial vehicle matches the target altitude.

(11) In the control system in (10), the control device includes a cable determining unit that determines whether tension acting on the at least one cable is greater than a threshold value and/or whether an angle of the at least one cable is greater than a threshold value, and corrects the target altitude of the unmanned aerial vehicle in accordance with a determination result of the cable determining unit. This allows the altitude of the unmanned aerial vehicle to follow the movement of the mobile object in a more stable manner.

(12) Another example of an unmanned aerial vehicle control system proposed in the present disclosure includes a base device to be mounted on a mobile object, an unmanned aerial vehicle, at least one cable including a power supply cable connecting the base device with the unmanned aerial vehicle, the power supply cable supplying electric power from the mobile object to the unmanned aerial vehicle, and a control device that controls flight of the unmanned aerial vehicle. The control device includes an aerial vehicle target altitude calculating unit that calculates a target altitude of the unmanned aerial vehicle, a cable determining unit that determines whether tension acting on the at least one cable satisfies a predetermined condition and/or whether an angle of the at least one cable satisfies a predetermined condition, and an aerial vehicle target correcting unit that corrects the target altitude of the unmanned aerial vehicle based on a determination result of the cable determining unit. This control system enables the relative altitude between the mobile object and the unmanned aerial vehicle to be properly set or maintained.

(13) An example of an unmanned aerial vehicle control method proposed in the present disclosure is a method for controlling an unmanned aerial vehicle that is connected to a base device to be mounted on a mobile object through at least one cable including a power supply cable. The method includes determining a target relative altitude of the unmanned aerial vehicle with respect to the mobile object and controlling the unmanned aerial vehicle so that a relative altitude of the unmanned aerial vehicle with respect to the mobile object matches the target relative altitude. This control method optimizes an altitude of the unmanned aerial vehicle in accordance with the mobile object. For example, the altitude of the unmanned aerial vehicle can be moved up and down in accordance with the movement of the mobile object.

(14) Another example of an unmanned aerial vehicle control method proposed in the present disclosure is a method for controlling an unmanned aerial vehicle that is connected to a base device to be mounted on a mobile object through at least one cable including a power supply cable. The method includes a calculating step of calculating a target altitude of the unmanned aerial vehicle, a cable determining step of determining whether tension acting on the at least one cable satisfies a predetermined condition and/or whether an angle of the at least one cable satisfies a predetermined condition, and a correcting step of correcting the target altitude of the unmanned aerial vehicle in accordance with a determination result in the cable determining step. This control method enables the relative altitude between the mobile object and the unmanned aerial vehicle to be properly set or maintained.

DETAILED DESCRIPTION OF THE INVENTION

Embodiment of the present invention will be described below in detail with reference to the accompanying drawings. The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises," "comprising," "includes," and/or "including," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of technologies are disclosed. Each of these has individual benefit and each can also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

FIG. 1 is a schematic diagram showing an unmanned aerial vehicle control system 1, which is an example of an embodiment of the present invention. The present disclosure is to be considered as an exemplification of the invention, and is not intended to limit the invention to the specific embodiments illustrated by the figures or description below.

[System Overview]

Figure 1A:
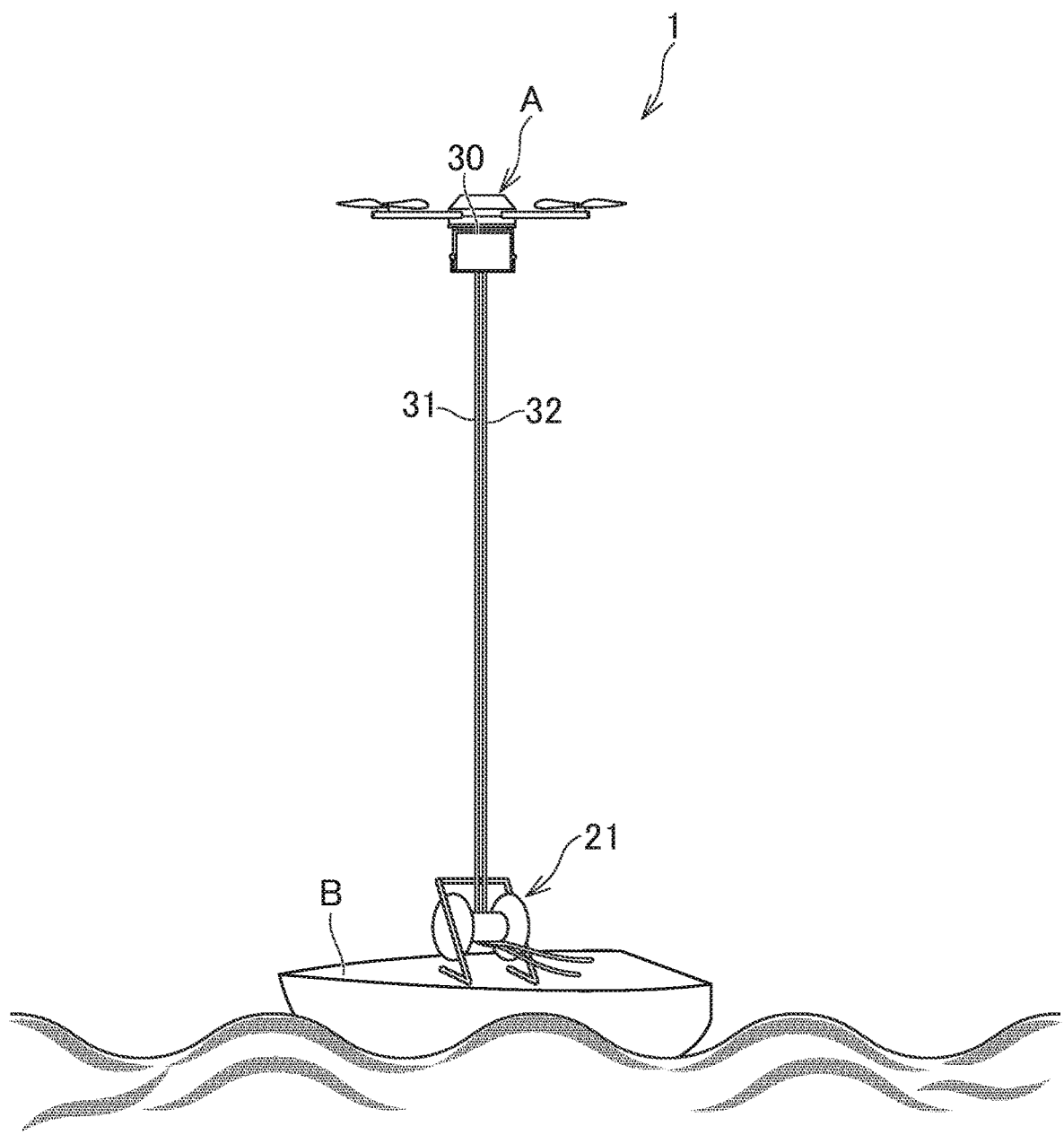
FIG. 1A is a schematic diagram illustrating an example of an unmanned aerial vehicle control system proposed in the present disclosure.

As shown in FIG. 1A, the control system 1 includes an unmanned aerial vehicle A, a base device U (see FIG. 2B) to be mounted on a mobile object B, and cables 31 and 32 connecting the unmanned aerial vehicle A and the base device U. An example of the mobile object B is a ship, although the mobile object B may be a vehicle traveling on land. The base device U includes a cable winding-up device 21 for winding the cables 31 and 32. The aerial vehicle A is, for example, a multicopter having a plurality of rotors, such as a quad-copter, a hexacopter, and an octocopter. In the following, the unmanned aerial vehicle A is simply referred to as an aerial vehicle.

The control system 1 includes a power supply cable 31, which supplies power to the aerial vehicle A from a battery 24 (see FIG. 2B) and/or a power generation device 29 mounted on the mobile object B, as a cable connecting the aerial vehicle A with the base device U. Further, the control system 1 includes a mooring cable 32, which is not used for electrical connection but used to prevent the aerial vehicle A from detaching from the mobile object B, as a cable connecting the aerial vehicle A with the base device U. The control system 1 may additionally include a communication cable for enabling communication between the aerial vehicle A and the base device U. Unlike the example shown in FIG. 1A, the control system 1 may only include the power supply cable 31 and not include the mooring cable 32. In this case, the power supply cable 31 may be reinforced to have a function of preventing the aerial vehicle A from detaching from the mobile object B. In other words, the mooring cable may be provided inside the power supply cable 31.

Figure 1B:
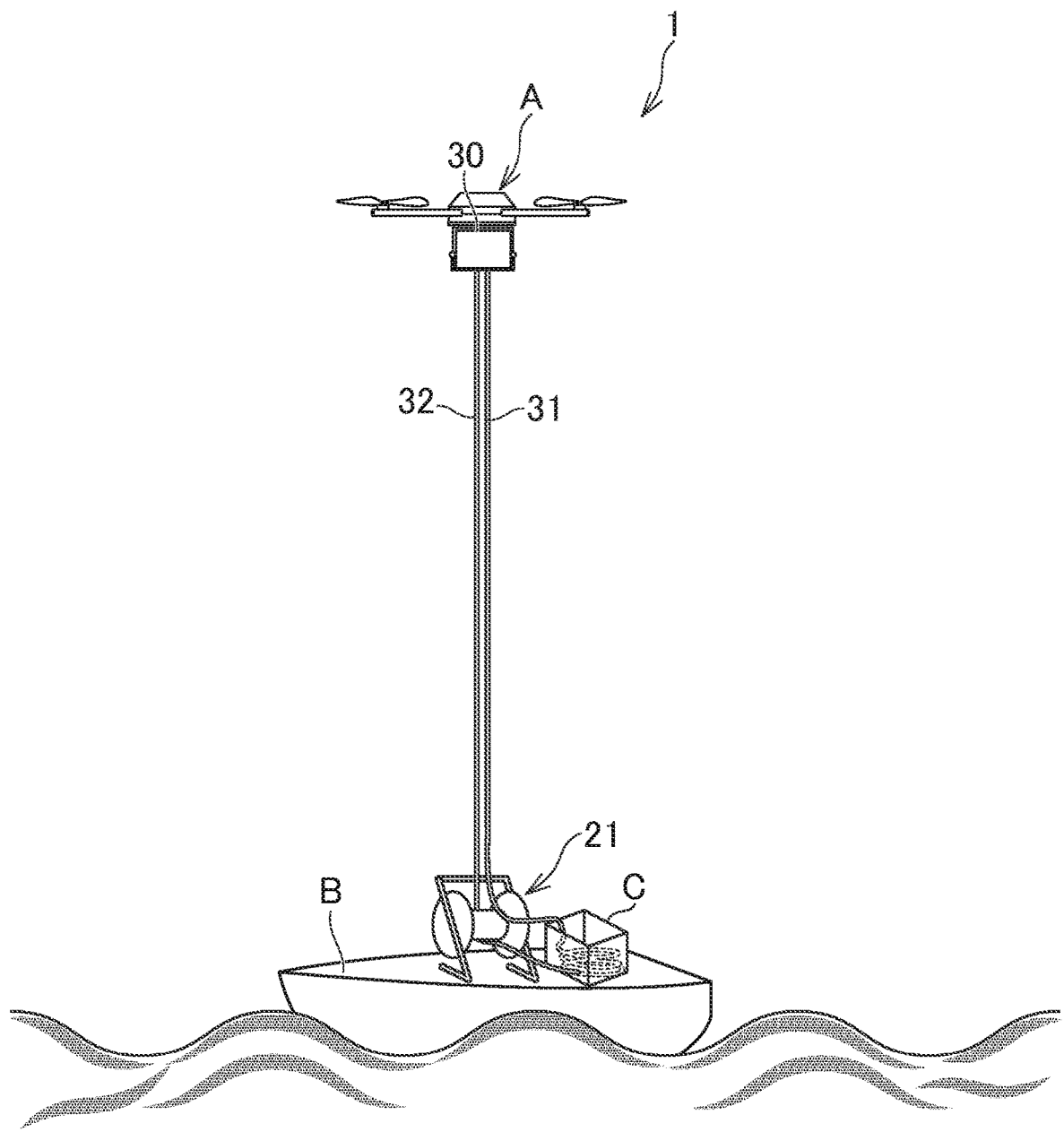
FIG. 1B is a schematic diagram illustrating another example of an unmanned aerial vehicle control system proposed in the present disclosure.

The cable winding-up device 21 has a cylindrical rotating portion, for example. The cables 31 and 32 are wound around the rotating portion. As shown in FIG. 1A, the winding-up device 21 may be configured to wind both the power supply cable 31 and the mooring cable 32. In this case, the winding-up device 21 may have a snap ring as a connection portion between the rotation portion and the supporting portion of the rotating portion so as to establish electrical connection. Alternatively, as shown in FIG. 1B, the winding-up device 21 may be configured to wind only the mooring cable 32. In this case, the mobile object B may include a housing box C for housing a cable (power supply cable 31 and communication cable described above) for establishing electrical connection between the aerial vehicle A and the base device U.

[Unmanned Aerial Vehicle]

Figure 2A:
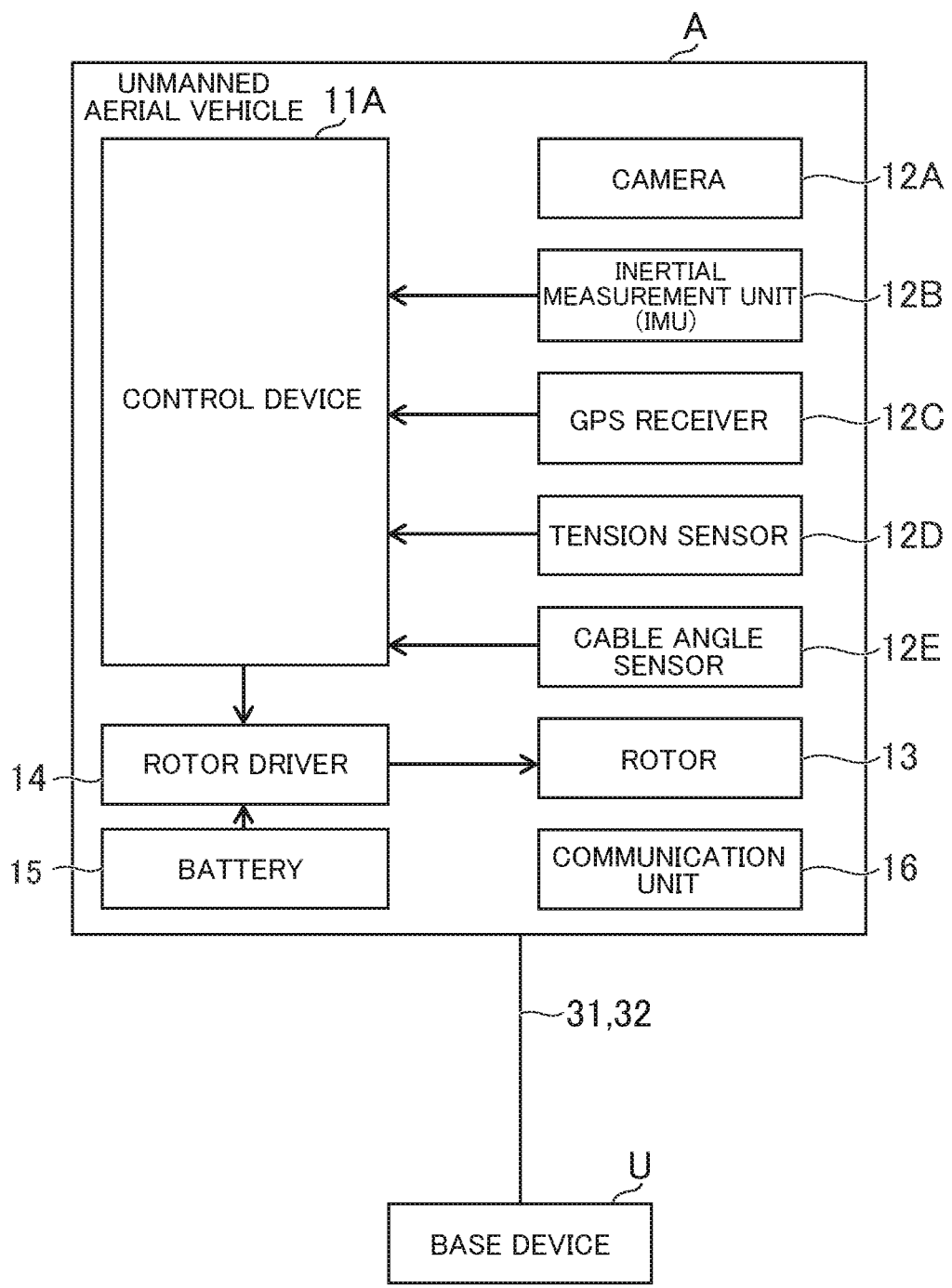
FIG. 2A is a block diagram showing hardware of the unmanned aerial vehicle.

The hardware of the aerial vehicle A will be described. FIG. 2A is a block diagram showing the hardware of the aerial vehicle A.

The aerial vehicle A includes a control device 11A. The control device 11A includes a memory and a microprocessor that executes programs recorded in the memory, and controls the motion and the attitude of the aerial vehicle A when the microprocessor executes the programs.

The aerial vehicle A includes a peripheral monitoring device for monitoring the periphery of the mobile object B. An example of the peripheral monitoring device is a camera 12A. The camera 12A is, for example, a stereo camera having two image sensors. The camera 12A may be a monocular camera having one image sensor. The aerial vehicle A may have a driving device for controlling the orientation of the camera 12A (e.g. pitch angle of the camera 12A). The image acquired by the camera 12A is transmitted to the base device U or stored in a storage unit of the aerial vehicle A. The image acquired by the camera 12A may be used for automatic control of the mobile object B, automatic docking of the mobile object B, detection of floating objects on the sea, detection of sufferers, detection of a flock of birds and a current, for example. The aerial vehicle A may include a radar (radio wave detector) or a LiDAR (light detection and ranging) as the peripheral monitoring device in addition to or in place of the camera 12A.

The aerial vehicle A includes an inertial measurement unit (IMU) 12B. The IMU 12B includes, for example, a three-axis acceleration sensor, a three-axis angular velocity sensor, and a geomagnetic sensor. A signal of the IMU 12B is fed into the control device 11A.

The aerial vehicle A includes a global positioning system (GPS) receiver 12C. The GPS receiver 12C may be, for example, a receiver (common GPS receiver) for receiving GPS signals from four or more GPS satellites by one antenna (one receiver) and performing single positioning for calculating a distance from the GPS satellites to the receiver. Further, a receiver capable of more highly accurate positioning, such as a receiver for performing positioning by DGPS (differential GPS) or RTK-GPS (real-time kinematic GPS), may be mounted as the GPS receiver 12C.

The aerial vehicle A includes a plurality of rotors 13. The number of rotors 13 is, for example, four or six, but is not limited thereto. The aerial vehicle A includes a battery 15 and a rotor driver 14. The battery 15 is charged by power supplied through a power supply cable 31. The rotor driver 14 uses the current from the battery 15 or the current from the power supply cable 31 to supply a current corresponding to a signal (command value) from the control device 11A to each of the rotors 13.

The aerial vehicle A includes a communication unit 16 that enables communication between the aerial vehicle A and the base device U. The communication performed by the communication unit 16 may be wireless communication or wired communication. The communication unit 16 transmits the image data acquired through the camera 12A to the base device U or receives the target relative altitude of the aerial vehicle A from the base device U. The control device 11A of the aerial vehicle A and a control device 11B to be described later of the base device U may exchange various information relating to the control of the aerial vehicle A (e.g., information on current altitudes of the aerial vehicle A and the mobile object B). In this manner, the processing relating to the control of the aerial vehicle A can be executed in both the control device 11A of the aerial vehicle A and the control device 11B of the base device U.

As shown in FIGS. 3A to 4B, the aerial vehicle A includes a cable coupler 30 to which the end of the mooring cables 32 is connected. The cable coupler 30 is connected to the end of the mooring cable 32 so as to allow the inclination of the mooring cable 32 with respect to the vertical direction of the aerial vehicle A (direction Dz in FIG. 3B). The cable coupler 30 includes a connecting portion 30a to which the end of the mooring cable 32 is connected and moves integrally (inclines integrally) with the end of the mooring cable 32. The cable coupler 30 includes, for example, two support shafts 30b and 30c that are perpendicular to each other. The connecting portion 30a may be supported so as to be rotatable about the two support shafts 30b and 30c.

As shown in FIG. 2A, the aerial vehicle A includes a tension sensor 12D for outputting a signal corresponding to the tension of the mooring cable 32. The tension sensor 12D outputs a signal corresponding to the force acting on the cable coupler 30 from the connecting portion 30a, for example. The tension sensor 12D may not be provided on the aerial vehicle A but on the base device U (more specifically, cable winding-up device 21).

Further, the aerial vehicle A includes a cable angle sensor 12E for detecting an angle of the mooring cable 32. The cable angle sensor 12E includes, for example, a sensor for outputting a signal corresponding to an angle $\theta 1$ (see FIG. 3B) of the mooring cable 32 with respect to the vertical direction of the aerial vehicle A (direction Dz in FIG. 3B). Such a sensor may be, for example, a rotation sensor for outputting a signal corresponding to the rotation angle of the support shafts 30b and 30c that support the connecting portion 30a. Alternatively, the cable angle sensor 12E may include a sensor for outputting a signal corresponding to an angle $\theta$ (see FIG. 3A) of the mooring cable 32 with respect to the vertical direction (gravitational direction, direction Dv in FIG. 3A). In this case, such a sensor may be an acceleration sensor for outputting a signal corresponding to the attitude of the connecting portion 30a. The cable angle sensor 12E may not be provided on the aerial vehicle A but on the base device U (more specifically, winding-up device 21). As will be described later, in an example of the control system 1, the angle of the mooring cable 32 is used to calculate the relative altitude of the aerial vehicle A with respect to the mobile object B.

The cable angle sensor 12E may include a sensor for outputting a signal corresponding to an angle $\varphi 1$ (see FIG. 4B) of the mooring cable 32 with respect to the reference direction (direction Dh in FIG. 4B) along the horizontal plane of the aerial vehicle A. In FIG. 4B, the reference direction Dh is the front-rear direction of the aerial vehicle A, although it may also be the left-right direction. The sensor may be a rotation sensor for outputting a signal corresponding to the rotation angle of the support shafts 30b and 30c supporting the connecting portion 30a, for example. Alternatively, the cable angle sensor 12E may be an acceleration sensor for outputting a signal corresponding to the attitude of the connecting portion 30a.

Figure 2B:
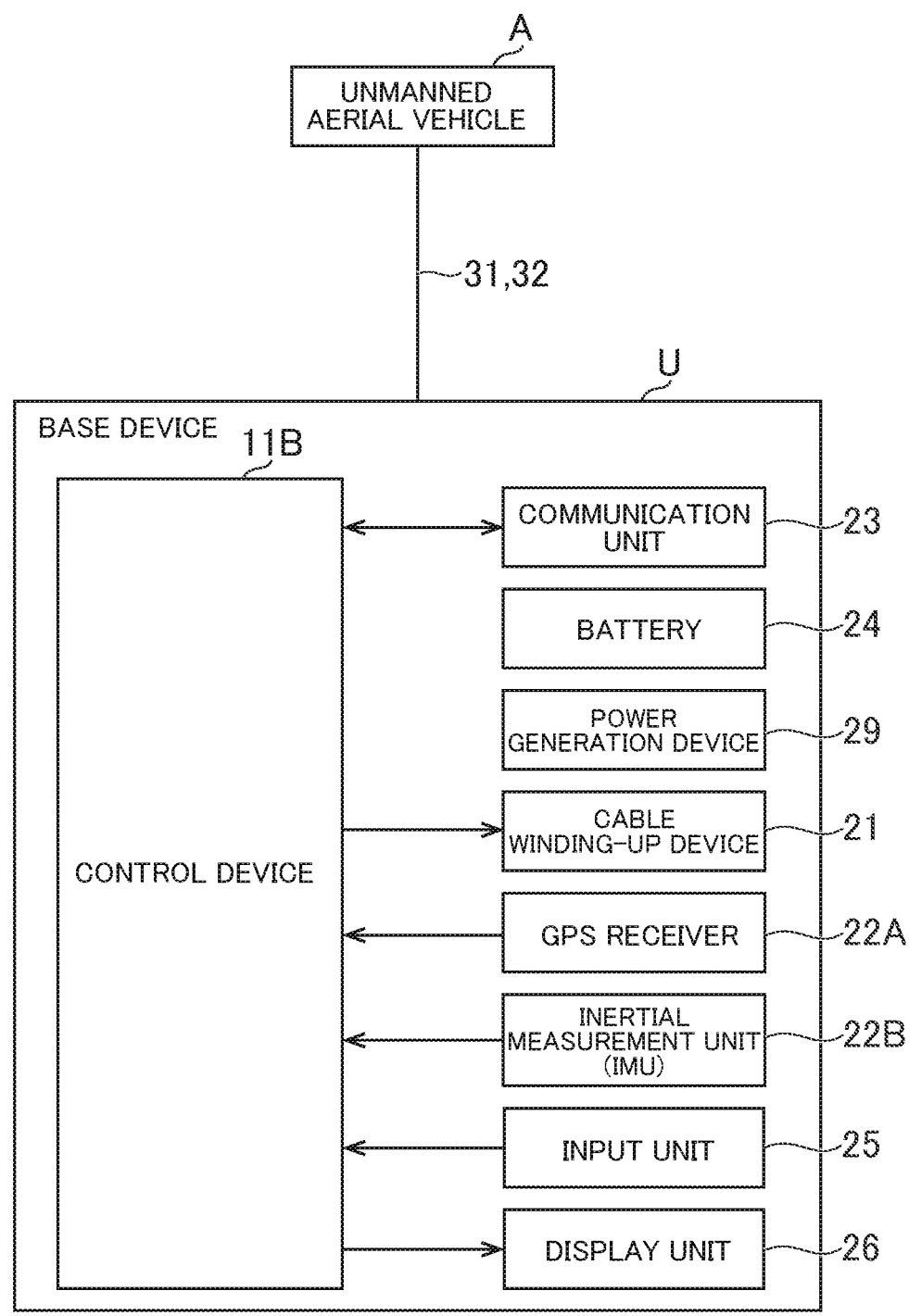
FIG. 2B is a block diagram showing hardware of a base device to be mounted on the mobile object.

The hardware of the base device U will be described. FIG. 2B is a block diagram showing the hardware of the base device U.

The base device U includes a control device 11B. The control device 11B includes a memory and a microprocessor that executes programs stored in the memory, and performs various processing relating to the aerial vehicle A when the microprocessor executes the programs. In an example, the control device 11B drives the cable winding-up device 21 and reels out the mooring cable 32 by a length corresponding to the altitude of the aerial vehicle A (target relative altitude to be described later). The control device 11B may be configured by a plurality of devices. For example, the control device 11B may be composed of a control device including a CPU and a memory mounted on a personal computer and a control device for controlling a driving source (e.g., engine) of the mobile object B.

The base device U includes a GPS receiver 22A. Similarly to the GPS receiver 12C mounted on the aerial vehicle A, the GPS receiver 22A is a receiver for performing single positioning, for example. Further, a receiver capable of more highly accurate positioning, such as a receiver for performing positioning by DGPS (differential GPS) or RTK-GPS (real-time kinematic GPS), may be mounted on the base device U as the GPS receiver 22A.

The base device U may include an inertial measurement unit (IMU) 22B. The IMU 22B includes, for example, a three-axis acceleration sensor, a three-axis angular velocity sensor, and a geomagnetic sensor. A signal of the IMU 22B is fed into the control device 11B.

The input unit 25 is, for example, a device for an operator to operate the aerial vehicle A. In the control system 1, the operator can input a target relative altitude of the aerial vehicle A to the mobile object B through the input unit 25. The input unit 25 may include a dial, joystick, and touch panel, for example. The input unit 25 may be a keyboard. The information entered through the input unit 25 is entered in the control device 11B or transmitted to the aerial vehicle A through the communication unit 23.

The display unit 26 is a monitor, and displays, for example, an image acquired by the camera 12A of the aerial vehicle A.

The base device U includes a battery 24. The battery 24 has a larger electrical capacity than the battery 15 mounted on the aerial vehicle A. The base device U supplies power of the battery 24 to the aerial vehicle A through the power supply cable 31. The base device U may have a relay that is controlled by the control device 11B and controls electric conduction between the battery 24 and the power supply cable 31.

The base device U may also have a power generation device 29. The power generation device 29 may generate power by receiving power from the engine, which is the driving source of the mobile object B. The battery 24 may be charged by power obtained by the power generation device 29.

[Processing Executed by Control Device]

Figure 5:
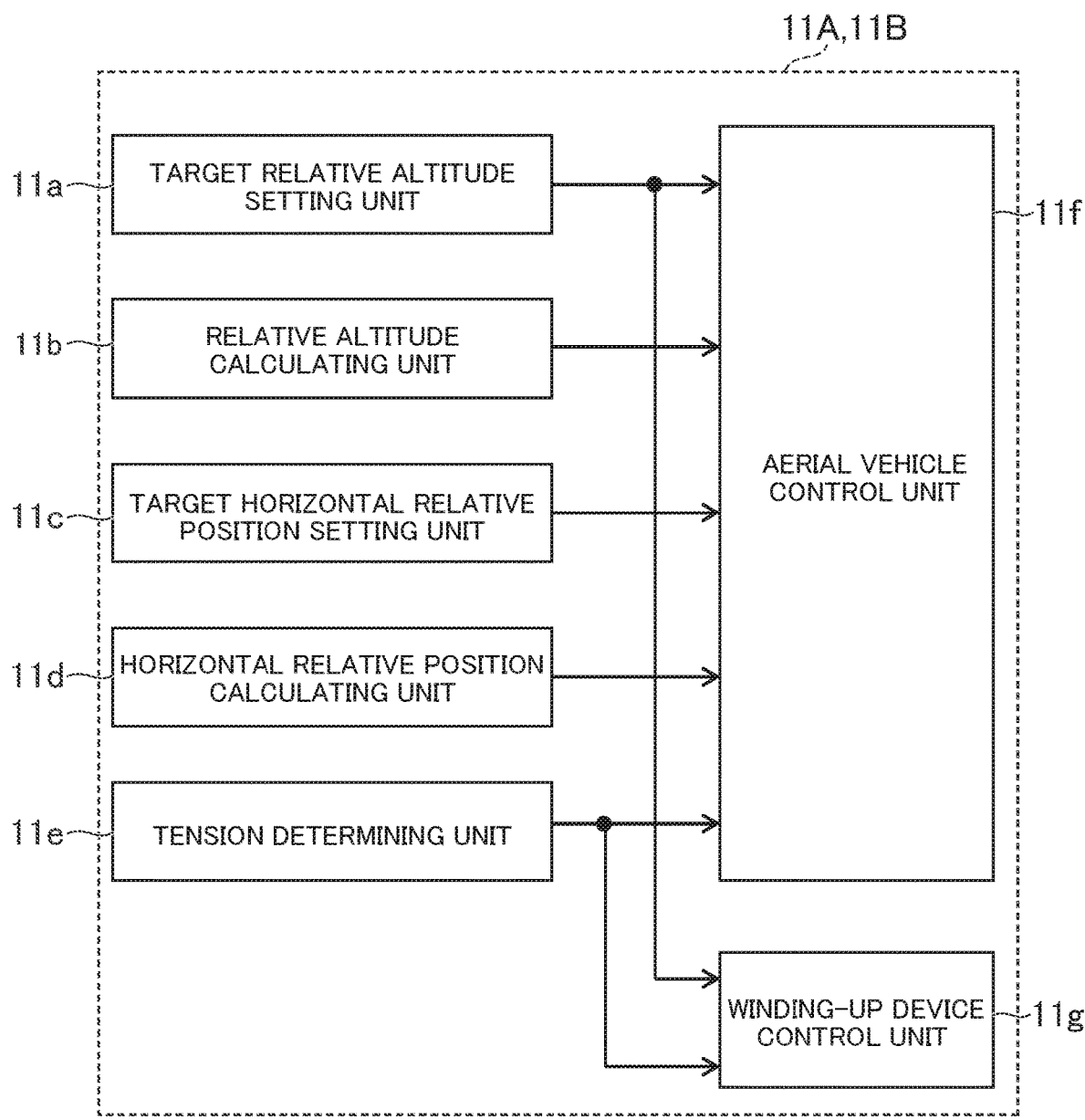
FIG. 5 is a block diagram showing functions of a control device of the unmanned aerial vehicle and a control device of the base device.

The processing executed by the control devices 11A and 11B will now be described. FIG. 5 is a block diagram illustrating the functions of the control devices 11A and 11B. Some of the functions shown in FIG. 5 are executed by the control device 11A mounted on the aerial vehicle A, and the rest of the functions are executed by the control device 11B mounted on the base device U. For example, a relative altitude calculating unit 11b, a horizontal relative position calculating unit 11d, a tension determining unit 11e, and an aerial vehicle control unit 11f may be controlled by the control device 11A mounted on the aerial vehicle A, and a target relative altitude setting unit 11a, a target horizontal relative position setting unit 11c, and a winding-up device control unit 11g may be controlled by the control device 11B mounted on the base device U.

The target relative altitude setting unit 11a sets a target of a relative altitude of the aerial vehicle A with respect to the mobile object B. The relative altitude is specified, for example, by the operator through the input unit 25 included in the base device U. The relative altitude may be several to several tens of meters, for example.

The relative altitude calculating unit 11b calculates the current relative altitude of the aerial vehicle A with respect to the mobile object B. The relative altitude calculating unit 11b calculates the current relative altitude based on an output of the cable angle sensor 12E, for example. If the cable angle sensor 12E is a sensor for outputting a signal corresponding to the angle $\theta 1$ (see FIG. 3B) of the mooring cable 32 with respect to the vertical direction (direction Dz) of the aerial vehicle A, the relative altitude calculating unit 11b acquires the angle $\theta 1$ and the attitude (pitch angle, roll angle, yaw angle) of the aerial vehicle A detected by the IMU 12B. The relative altitude calculating unit 11b then calculates the angle $\theta$ between the mooring cable 32 and the vertical direction (gravitational direction, direction Dv in FIG. 3A) based on the angle $\theta 1$ and the attitude of the aerial vehicle A. The relative altitude calculating unit 11b calculates the current relative altitude H of the aerial vehicle A based on the angle $\theta$ and the current length L of the mooring cable 32 (the length of the mooring cable 32 being reeled out from the winding-up device 21).

If the cable angle sensor 12E is an acceleration sensor attached to the end of the mooring cable 32, the cable angle sensor 12E outputs a signal corresponding to the angle $\theta$ between the vertical direction (gravitational direction, direction Dv in FIG. 3A) and the mooring cable 32. As such, in this case, the relative altitude calculating unit 11b may calculate the current relative altitude H of the aerial vehicle A based on the angle $\theta$ and the length L of the mooring cable 32 without using the attitude of the aerial vehicle A. The length L of the mooring cable 32 can be calculated based on a rotation angle of the rotating portion of the cable winding-up device 21.

The target horizontal relative position setting unit 11c sets a target of a horizontal relative position of the aerial vehicle A with respect to the mobile object B. Here, the horizontal relative position is the relative positions of the mobile object B and the aerial vehicle A when viewed from above. The horizontal relative position is directly above the mobile object B, for example, although the horizontal relative position may be a position shifted forward, rearward, rightward, or leftward from the mobile object B. The horizontal relative position may be changed by the operator or may be predetermined. In a case where the horizontal relative position can be changed by the operator, the horizontal relative position may be specified by the operator through the input unit 25 included in the base device U, for example. In a case where the horizontal relative position is predetermined, if the horizontal relative position is defined to be directly above the cable winding-up device 21, for example, the control devices 11A and 11B may not include the target horizontal relative position setting unit 11c. The mobile object B may include an infrared light emitting device. In this case, the horizontal relative position may be defined to be directly above the infrared light emitting device.

The horizontal relative position calculating unit 11d calculates the current horizontal relative position of the aerial vehicle A with respect to the mobile object B. The horizontal relative position may be calculated by various methods.

Figure 3A:
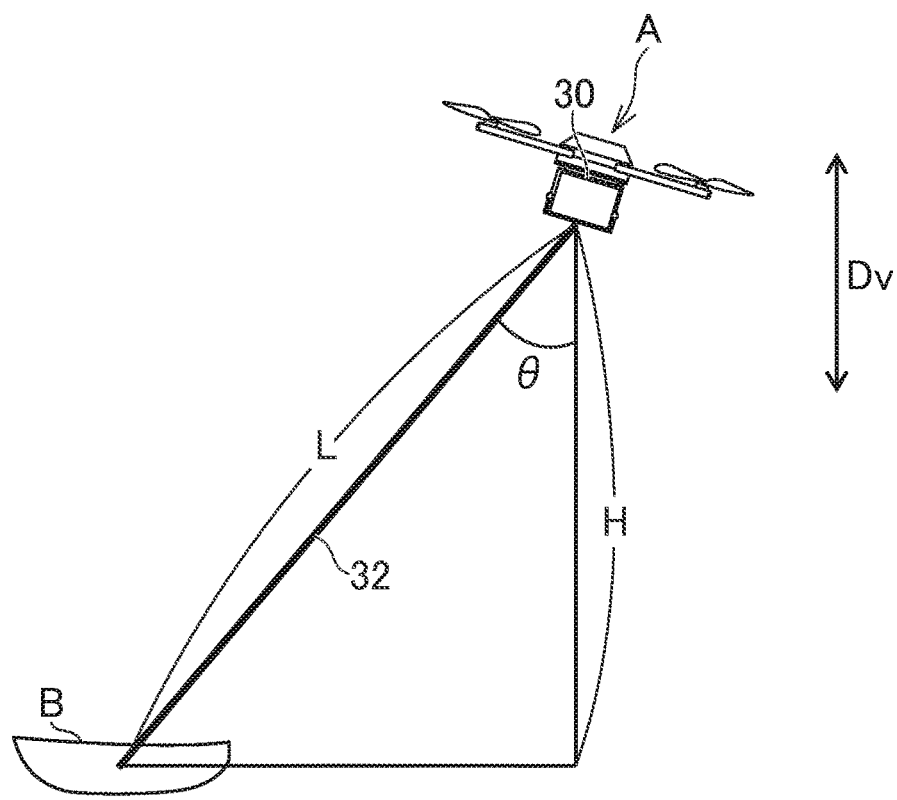
FIG. 3A is a diagram for explaining a cable angle sensor and showing the mobile object and the unmanned aerial vehicle in a side view.
Figure 3B:
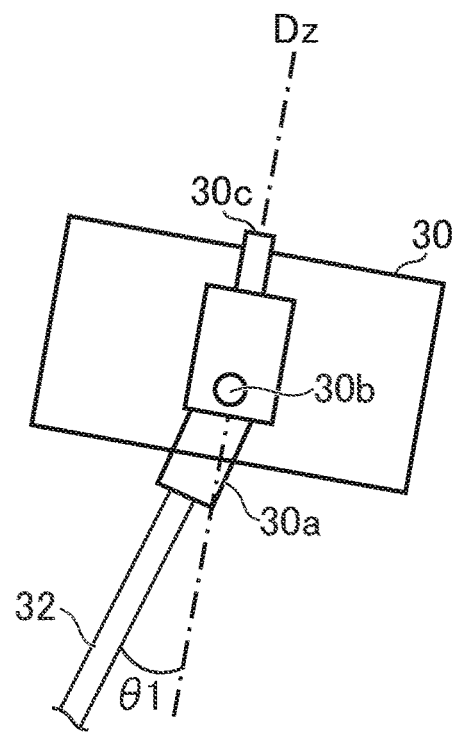
FIG. 3B is a diagram for explaining the cable angle sensor and showing a cable coupler of the unmanned aerial vehicle in a side view.
Figure 4A:
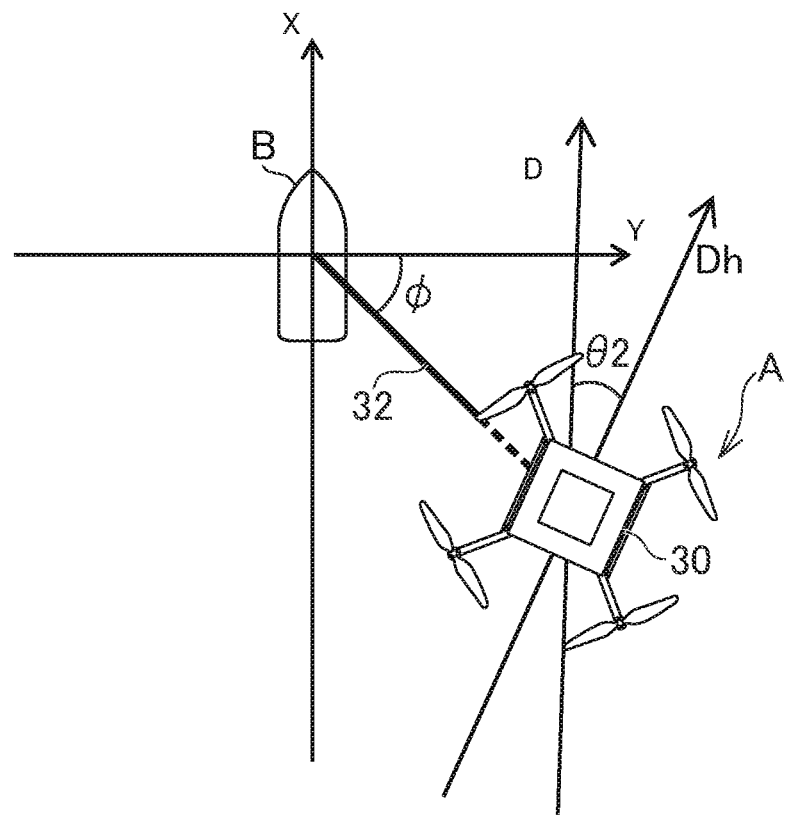
FIG. 4A is a diagram for explaining the cable angle sensor and showing the mobile object and the unmanned aerial vehicle in a plan view.
Figure 4B:
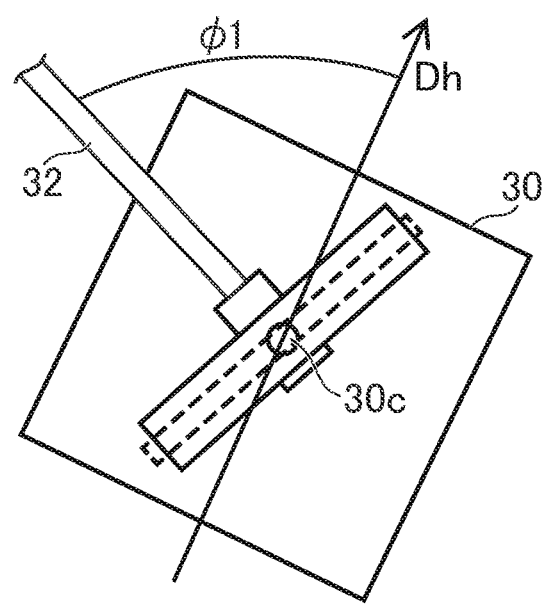
FIG. 4B is a diagram for explaining the cable angle sensor and showing the cable coupler of the unmanned aerial vehicle in a plan view.

The horizontal relative position may be represented by, for example, X-Y coordinates shown in FIG. 4A. As described with reference to FIGS. 4A and 4B, if the cable angle sensor 12E includes a sensor for outputting a signal corresponding to the angle $\varphi 1$ (see FIG. 4B) of the mooring cable 32 with respect to the reference direction along the horizontal plane of the aerial vehicle A, the horizontal relative position calculating unit 11d may calculate the horizontal relative position using the angle $\varphi 1$. For example, the horizontal relative position calculating unit 11d may calculate the angle $\varphi$ (see FIG. 4A) of the mooring cable 32 with respect to the mobile object B based on the angle $\varphi 1$, the angle $\varphi 2$ (see FIG. 4A) representing the orientation of the aerial vehicle A, the angle $\theta$ (see FIG. 3A) between the vertical direction and the mooring cable 32, and the attitude (pitch angle, roll angle, yaw angle) of the aerial vehicle A detected by the IMU 12B. The horizontal relative position calculating unit 11d may calculate the current relative position of the aerial vehicle A in the horizontal plane with respect to the mobile object B based on the angle $\varphi$ of the mooring cable 32 and the length L of the mooring cable 32.

As another example of calculation of the horizontal relative position, the horizontal relative position calculating unit 11d may calculate the horizontal position of the aerial vehicle A (the position of the aerial vehicle A on the horizontal plane along the sea surface) by the GPS receiver 12C mounted on the aerial vehicle A, and calculate the horizontal position of the mobile object B (position of the mobile object B on the horizontal plane along the sea surface) by the GPS receiver 22A mounted on the base device U, and then calculate the horizontal relative position from the differences in the calculated positions. As yet another example, if an infrared light emitting device is mounted on the mobile object B, the aerial vehicle A may include an infrared camera. The horizontal relative position calculating unit 11d may calculate the horizontal relative position of the aerial vehicle A with respect to the mobile object B based on a position of the light emitting device in an infrared image.

The tension determining unit 11e detects tension of the mooring cable 32 based on the output of the tension sensor 12D, and determines whether the detected tension is smaller than a predetermined threshold value (upper limit value) of tension of the mooring cable 32. If the tension is greater than the threshold value (upper limit value), the aerial vehicle control unit 11f commands a reduction in the distance between the aerial vehicle A and the mobile object B, for example. Further, the tension determining unit 11e may determine whether the tension of the mooring cable 32 is greater than a predetermined threshold value (lower limit value). If the tension is smaller than the threshold value (lower limit), the aerial vehicle control unit 11*f* may command an increase in the distance between the aerial vehicle A and the mobile object B, for example.

The aerial vehicle control unit 11*f* calculates a command value corresponding to an angular velocity of each rotor 13 based on the difference between the current relative altitude and the target relative altitude of the aerial vehicle A with respect to the mobile object B and the difference between the current horizontal relative position and the target horizontal relative position, and outputs the calculated command value to the rotor driver 14. The rotor driver 14 supplies current corresponding to the command value to each rotor 13. The aerial vehicle control unit 11*f* calculates, for example, a target roll angle, a target pitch angle, and a target yaw angle of the aerial vehicle A based on these differences. The aerial vehicle control unit 11*f* then calculates the command value described above based on the target roll angle, the target pitch angle, and the target yaw angle. The aerial vehicle control unit 11*f* may execute PID (Proportional Integral Differential) control for the roll angle, the pitch angle, and the yaw angle of the aerial vehicle A. By this processing of the aerial vehicle control unit 11*f*, the relative altitude and the horizontal relative position of the aerial vehicle A are respectively changed toward the target relative altitude and the target horizontal relative position.

When the tension of the mooring cables 32 exceeds a predetermined range (a range defined by the upper limit and the lower limit described above), the aerial vehicle control unit 11*f* may raise or lower the aerial vehicle A so that the tension falls to within the predetermined range.

The IMU 12B of the aerial vehicle A and the IMU 22B of the base device U each include a geomagnetic sensor. The aerial vehicle control unit 11*f* may control the direction of the aerial vehicle A by using outputs of these two geomagnetic sensors so that the direction of the aerial vehicle A matches the direction of the mobile object B (traveling direction).

The winding-up device control unit 11*g* drives the cable winding-up device 21 so as to control the length L of the mooring cable 32 being reeled out from the winding-up device 21. The winding-up device control unit 11*g* sets the length L of the mooring cable 32 to a length according to the target relative altitude of the aerial vehicle A. When the aerial vehicle A flies toward the target relative altitude from the mobile object B, the winding-up device control unit 11*g* may increase the length L of the mooring cable 32 at a velocity corresponding to the current relative altitude of the aerial vehicle A and/or the tension of the mooring cable 32.

Figure 6:
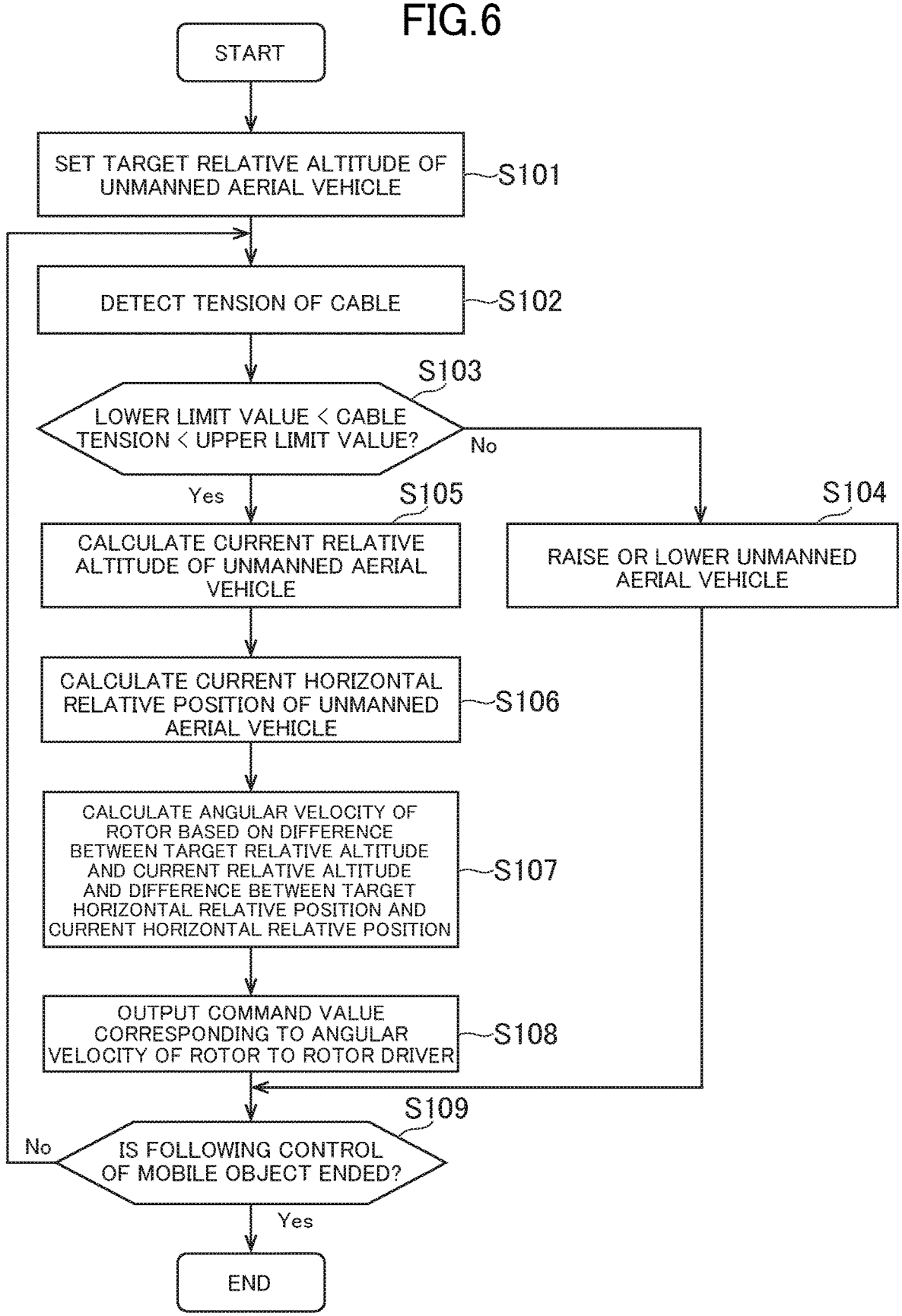
FIG. 6 is a flow chart showing processing performed in the control device of the unmanned flight and the control device of the base device.

The processing executed by the control devices 11A and 11B for controlling the aerial vehicle A will be described. FIG. 6 is a flow chart showing an example of the processing.

First, the target relative altitude setting unit 11*a* sets a target relative altitude (S101). In a control system where the operator can adjust not only the target relative altitude but also the target horizontal relative position, a target horizontal relative position may also be set in S101.

Next, the tension of the mooring cable 32 is detected (S102). The tension determining unit 11*e* determines whether the detected tension of the mooring cable 32 is between the predetermined lower limit value and upper limit value (S103). If the tension of the mooring cable 32 is less than the lower limit value, the aerial vehicle control unit 11*f* raises the aerial vehicle A (S104). If the tension of the mooring cable 32 is greater than the upper limit value, the aerial vehicle control unit 11*f* lowers the aerial vehicle A (S104). The processing of the control devices 11A and 11B then proceeds to S109.

If the tension of the mooring cable 32 is between the predetermined lower limit value and upper limit value, the relative altitude calculating unit 11*b* calculates the current relative altitude of the aerial vehicle A with respect to the mobile object B (S105). Specifically, the relative altitude calculating unit 11*b* calculates the angle θ (see FIG. 3A) of the mooring cable 32 with respect to the vertical direction based on the output of the cable angle sensor 12E, and calculates the relative altitude H (see FIG. 3A) based on the current length L and the angle θ of the mooring cable 32.

The horizontal relative position calculating unit 11*d* calculates the current horizontal relative position of the aerial vehicle A with respect to the mobile object B (S106). As described above, this calculation may use the output (angle φ1) of the cable angle sensor 12E, the horizontal positions of the mobile object B and the aerial vehicle A obtained through the GPS receivers 12C and 22A, and the infrared image.

The aerial vehicle control unit 11*f* calculates a command value corresponding to an angular velocity of each rotor 13 based on the difference between the current relative altitude and the target altitude of the aerial vehicle A with respect to the mobile object B and the difference between the current horizontal relative position and the target horizontal relative position of the aerial vehicle A with respect to the mobile object B, and outputs the calculated command value to the rotor driver 14 (S107, S108).

The control devices 11A and 11B determine whether an end condition of following control of the aerial vehicle A for the mobile object B is satisfied (S109), and, if the end condition is not satisfied, the processing returns to S102. If the end condition is satisfied, the control devices 11A and 11B end the following control (processing performed in S102 to S108). The end condition is, for example, an input of an end instruction by the operator into the input unit 25. When the following control ends, the control device 11B may drive the cable winding-up device 21 to gradually collect the mooring cable 32.

[Example of Controlling Relative Altitude Using GPS]

The control devices 11A and 11B may control the relative altitude of the aerial vehicle A by using the position information (including altitude) of the mobile object B and the aerial vehicle A detected by the GPS receivers 12C and 22A. In this case, the GPS receivers 12C and 22A are preferably capable of detecting the altitudes of the aerial vehicle A and the mobile object B with high accuracy. For example, the GPS receivers 12C and 22A are receivers that performs positioning by RTK-GPS (Real Time Kinematic GPS). If the base device U and the aerial vehicle A include such a GPS receiver, the control system 1 may not have the tension sensor 12D and the cable angle sensor 12E described above. The other hardware may be the same as the hardware described with reference to FIGS. 2A and 2B.

Figure 7A:
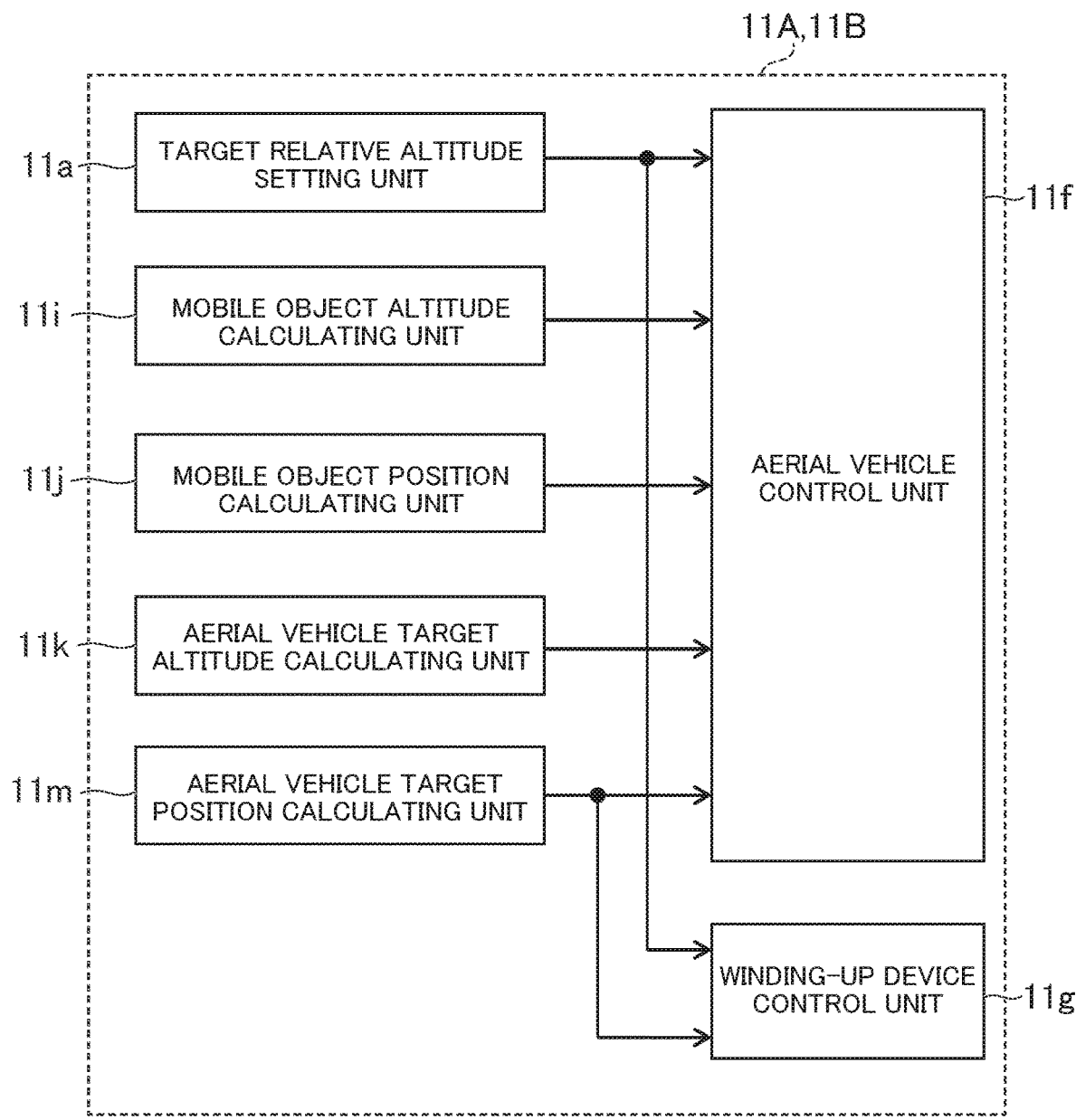
FIG. 7A is a block diagram showing functions of the control device of the unmanned aerial vehicle and the control device of the base device according to a modification. Here, an example is shown in which an altitude of the unmanned aerial vehicle is controlled by using a GPS signal.

FIG. 7A is a block diagram showing the processing executed by the control devices 11A and 11B in such a mode.

The mobile object altitude calculating unit 11*i* calculates the current altitude of the mobile object B based on the GPS signal received by the GPS receiver 22A. The mobile object altitude calculating unit 11*i* may use outputs of the IMU 22B. For example, if the acquisition frequency of the position information based on the GPS signal is lower than the frequency required by the control of the aerial vehicle A, the mobile object altitude calculating unit 11*i* may calculate (estimate) the current altitude of the mobile object B based on the latest altitude calculated from the GPS signal and the output of IMU 22B. That is, the mobile object altitude calculating unit 11*i* may use the output of the IMU 22B to complement the altitude in a period in which a GPS signal is not received.

The mobile object position calculating unit 11*j* calculates the current horizontal position of the mobile object B (i.e., latitude and longitude) based on the GPS signal received by the GPS receiver 22A. The mobile object position calculating unit 11*j* may use the output of the IMU 22B. For example, if the acquisition frequency of the position information based on the GPS signal is lower than the frequency required by the control of the aerial vehicle A, the mobile object position calculating unit 11*j* may calculate (estimate) the current horizontal position of the mobile object B based on the latest horizontal position calculated from the GPS signal and the output of IMU 22B. That is, the mobile object position calculating unit 11*j* may use the output of the IMU 22B to complement the horizontal position in a period in which a GPS signal is not received.

The aerial vehicle target altitude calculating unit 11*k* calculates a target altitude of the aerial vehicle A based on the calculated current altitude of the mobile object B and the target relative altitude of the aerial vehicle A. Specifically, the aerial vehicle target altitude calculating unit 11*k* may add the target relative altitude to the calculated current altitude of the mobile object B, and set the obtained value as the target altitude of the aerial vehicle A.

The aerial vehicle target position calculating unit 11*m* calculates a target horizontal position (target latitude and target longitude) of the aerial vehicle A based on the calculated current horizontal position (latitude and longitude) of the mobile object B and the target horizontal relative position. For example, the aerial vehicle target position calculating unit 11*m* adds the target horizontal relative position to the calculated current horizontal position of the mobile object B, and sets the obtained value as the target horizontal position of the aerial vehicle A. In the control system where the horizontal relative position is set directly above the mobile object B, the calculated current horizontal position of the mobile object B may be set as the target horizontal position of the aerial vehicle A.

The aerial vehicle control unit 11*f* calculates a command value according to an angular velocity of each rotor 13 based on the difference between the target altitude calculated by the aerial vehicle target altitude calculating unit 11*k* and the current altitude of the aerial vehicle A, and the difference between the target horizontal position calculated by the aerial vehicle target position calculating unit 11*m* and the current horizontal position of the aerial vehicle A, and outputs the calculated command value to the rotor driver 14. This processing of the aerial vehicle control unit 11*f* enables the altitude and the horizontal position of the aerial vehicle A to be closer to the target altitude and the target horizontal position, respectively.

Figure 7B:
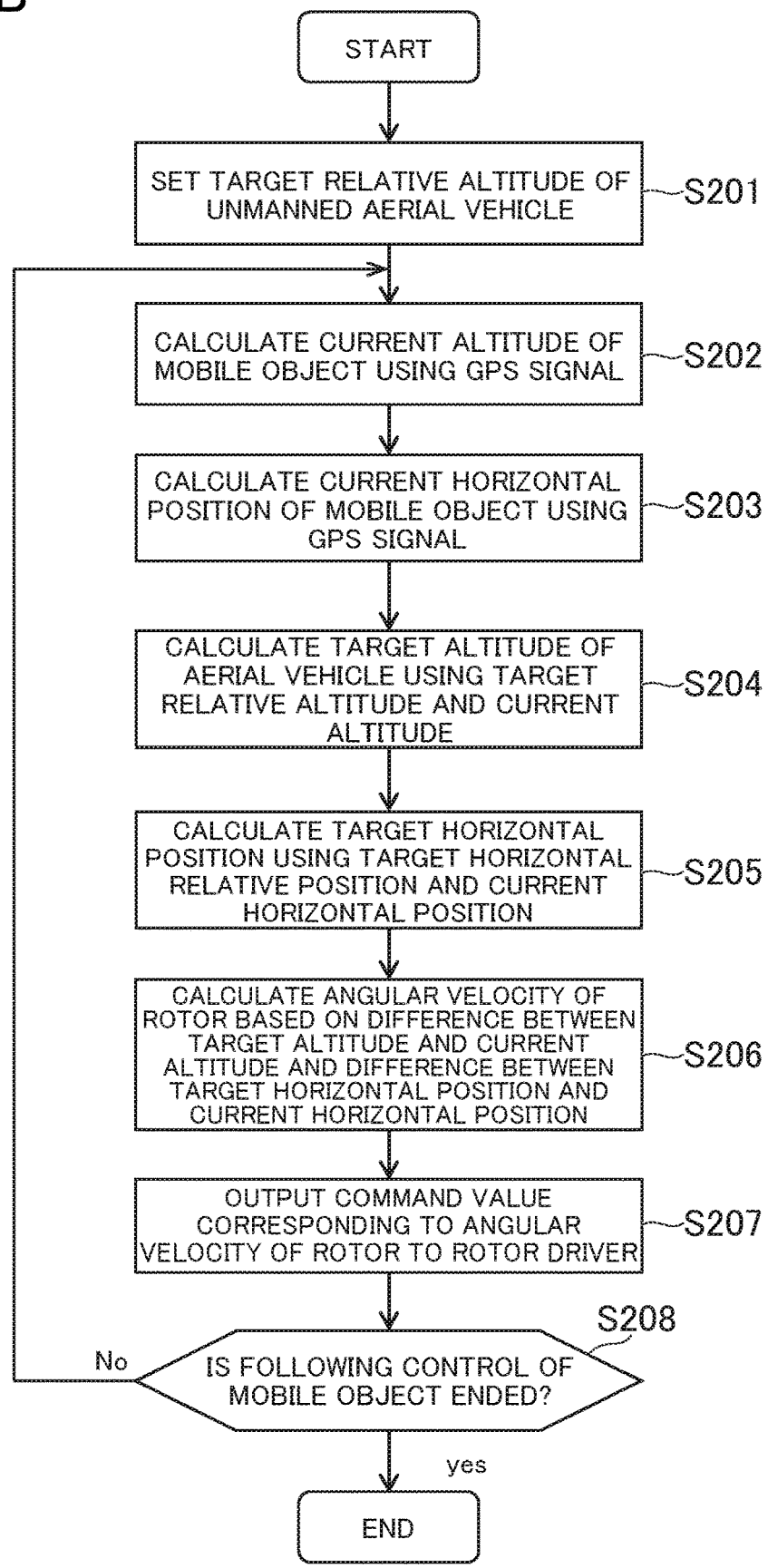
FIG. 7B is a flow chart showing the processing performed by the control device in FIG. 7A.

The processing executed by the control devices 11A and 11B for calculating a relative altitude using the GPS receiver will now be described. FIG. 7B is a flow chart showing an example of the processing.

First, the target relative altitude setting unit 11*a* (see FIG. 7A) sets a target relative altitude (S201). In a control system where the operator can adjust not only the target relative altitude but also the target horizontal relative position, a target horizontal relative position may also be set in S201.

Next, the mobile object altitude calculating unit 11*i* calculates the current altitude of the mobile object B based on the GPS signal received by the GPS receiver 22A (S202). The mobile object altitude calculating unit 11*i* may use the output of the IMU 22B to complement the altitude in a period in which a GPS signal is not received. Further, the mobile object position calculating unit 11*j* calculates the current horizontal position of the mobile object B (i.e., latitude and longitude) based on the GPS signal received by the GPS receiver 22A (S203). The mobile object position calculating unit 11*j* may use the output of IMU 22B to complement the position in a period in which a GPS signal is not received.

The aerial vehicle target altitude calculating unit 11*k* calculates a target altitude of the aerial vehicle A based on the current altitude of the mobile object B calculated in S202 and the target relative altitude determined in S201 (S204). As described above, for example, the aerial vehicle target altitude calculating unit 11*k* adds the target relative altitude to the calculated current altitude of the mobile object B and sets the obtained value as the target altitude of the aerial vehicle A. Further, the aerial vehicle target position calculating unit 11*m* calculates a target horizontal position (target latitude and target longitude) of the aerial vehicle A based on the calculated current horizontal position (latitude and longitude) and the target horizontal relative position of the mobile object B (S205). As described above, in the control system in which the aerial vehicle A is required to be positioned directly above the mobile object B, the calculated (estimated) current horizontal position of the mobile object B may be set as the target horizontal position of the aerial vehicle A.

The aerial vehicle control unit 11*f* calculates a command value corresponding to an angular velocity of each rotor 13 based on the difference between the target altitude calculated in S204 and the current altitude of the aerial vehicle A and the difference between the target horizontal position calculated in S205 and the current horizontal position of the aerial vehicle A, and outputs the calculated command value to the rotor driver 14 (S206, S207).

The control devices 11A and 11B determine whether an end condition of following control of the aerial vehicle A for the mobile object B is satisfied (S208), and, if the end condition is not satisfied, the process returns to S202. If the end condition is satisfied, the control devices 11A and 11B end the following control (processing performed in S202 to S208). The end condition is, for example, an input of an end instruction by the operator into the input unit 25.

[Example of Controlling Relative Altitude Using Camera Image]

Figure 8A:
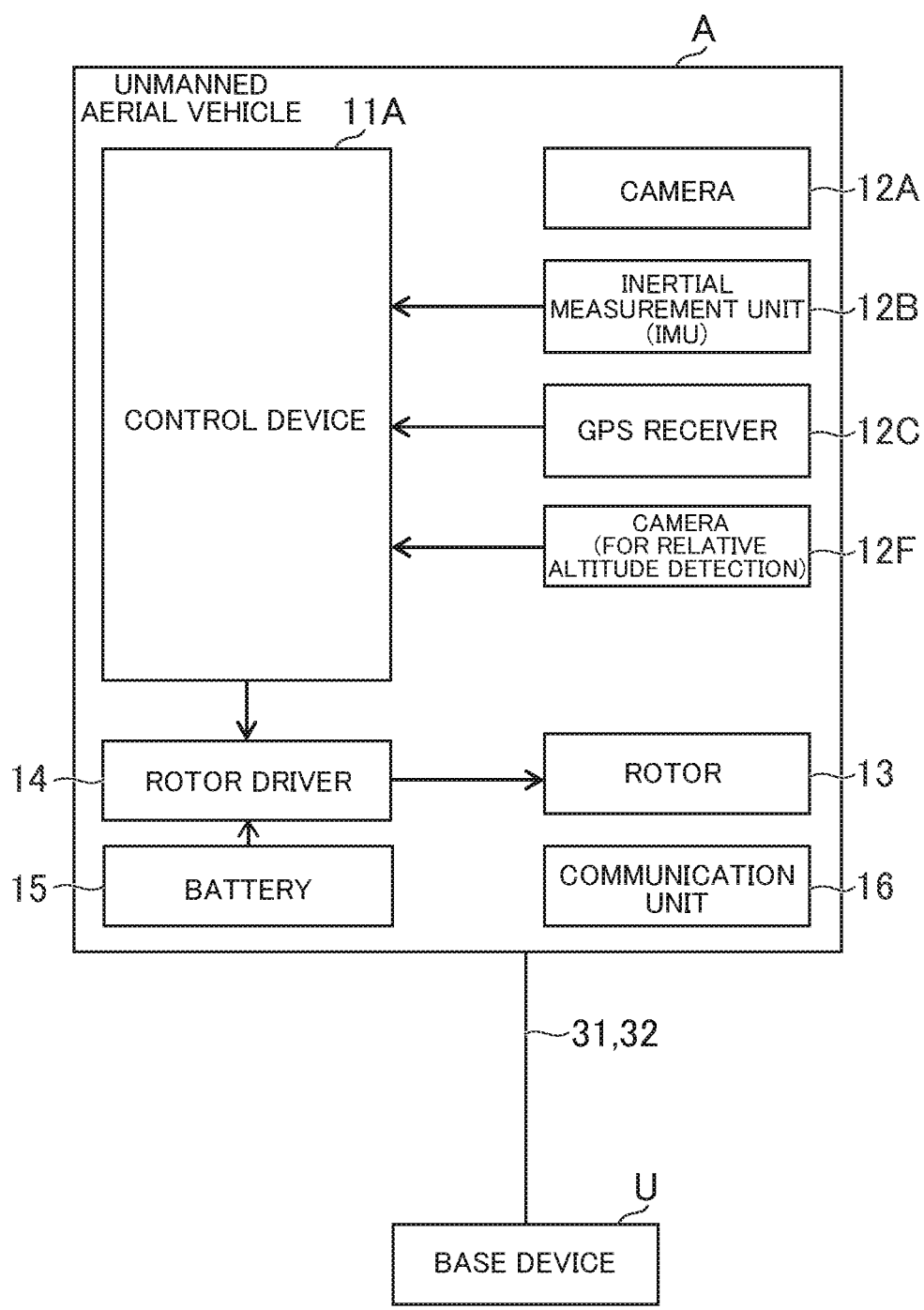
FIG. 8A is a block diagram showing hardware of an unmanned aerial vehicle according to a modification. Here, the unmanned aerial vehicle is equipped with a camera for detecting a relative altitude of the unmanned aerial vehicle.

One of the aerial vehicle A and the base device U may include a camera for detecting a relative altitude of the aerial vehicle A. FIG. 8A is a diagram showing an example of the aerial vehicle A having such a camera. The aerial vehicle A shown in FIG. 8A includes a camera 12F for detecting a relative altitude in addition to the camera 12A for capturing the periphery of the mobile object B. The camera 12F is installed in the aerial vehicle A so as to face the mobile object B. For example, if the horizontal relative position is directly above the mobile object B, the camera 12F may be mounted on the aerial vehicle A so as to face directly downward. The camera 12F may be a visible light camera, for example. The camera 12F may be a monocular camera or a stereo camera. The camera for calculating the relative altitude may be mounted on the base device U. In this case, the camera may be installed on the mobile object B so as to face the aerial vehicle A. If such a camera is mounted on the base device U or the aerial vehicle A, as shown in FIG. 8A, the control system 1 may not have the tension sensor 12D and the cable angle sensor 12E described above. The other hardware may be the same as the hardware described with reference to FIGS. 2A and 2B.

In a case where the camera 12F is installed in the aerial vehicle A, the relative altitude calculating unit 11b (see FIG. 5) performs image recognition processing on the image acquired by the camera 12F, and calculates the relative altitude of the aerial vehicle A. For example, the mobile unit B may be marked in advance. The relative altitude calculating unit 11b may calculate a relative altitude of the aerial vehicle A based on the size of the mark on the image, for example. When the altitude of the aerial vehicle A is higher, the size of the mark on the image gets smaller. As such, the relative altitude of the aerial vehicle A can be calculated from the size of the mark. The mobile unit B itself may be used as a mark. That is, the relative altitude calculating unit 11b may calculate the relative altitude of the aerial vehicle A based on the size of the mobile object B appearing in the image. If the camera 12F is provided in the base device U, the relative altitude calculating unit lib may calculate a relative altitude of the aerial vehicle A based on the size of the aerial vehicle A displayed in the image.

The horizontal relative position calculating unit 11d (see FIG. 5) may use the image acquired by the camera 12F to calculate a horizontal relative position of the aerial vehicle A. The horizontal relative position calculating unit 11d may calculate the horizontal relative position of the aerial vehicle A with respect to the mobile object B based on the position of the mark in the image. For example, if the aerial vehicle A is positioned directly above the mobile B (mark), the mark appears at the center of the image. When the aerial vehicle A deviates from the position of the mobile object B (mark), the position of the mark appearing in the image is also deviated from the center of the image. Alternatively, the horizontal relative position calculating unit 11d may calculate the horizontal relative position of the aerial vehicle A using the output of the GPS receivers 12C and 22A instead of the camera 12F.

Figure 8B:
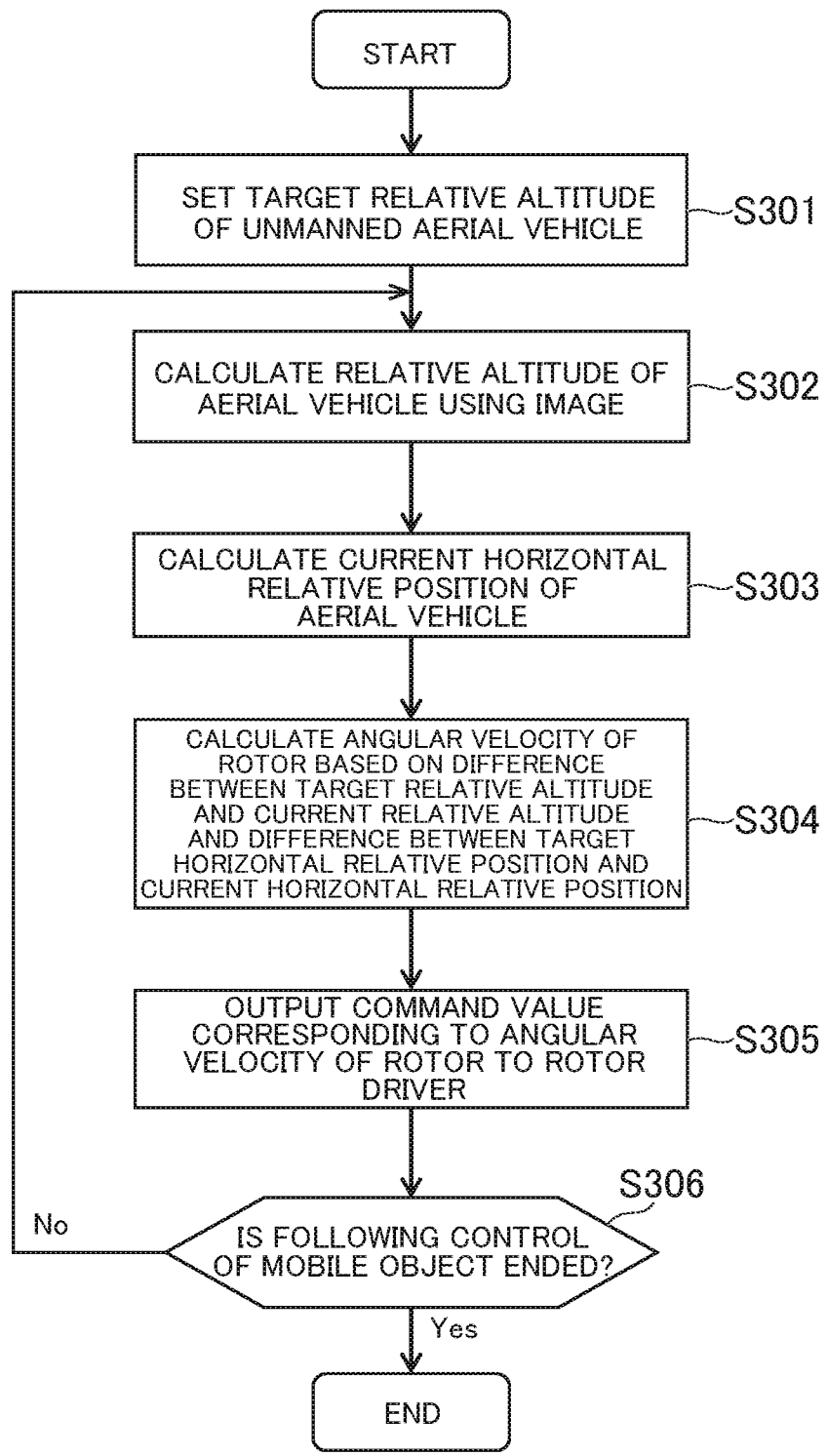
FIG. 8B is a flow chart showing the processing performed by the control system having the camera shown in FIG. 8A.

The processing performed by the control devices 11A and 11B for calculating a relative altitude using the camera 12F will be described. FIG. 8B is a flow chart showing an example of the processing.

First, the target relative altitude setting unit 11a (see FIG. 5) sets a target relative altitude (S301). In a control system where the operator can adjust not only the target relative altitude but also the target horizontal relative position, a target horizontal relative position may also be set in S301.

The relative altitude calculating unit lib performs image recognition processing on the image acquired by the camera 12F, and calculates the relative altitude of the aerial vehicle A (S302).

The horizontal relative position calculating unit 11d performs image recognition processing for the image acquired by the camera 12F, and calculates the current horizontal relative position of the aerial vehicle A (S303). In S303, the horizontal relative position calculating unit 11d may calculate the horizontal position of the aerial vehicle A based on the output of the GPS receiver 12C and acquire the horizontal position of the mobile object B based on the output of the GPS receiver 22A. The horizontal relative position calculating unit 11d may calculate the horizontal relative position based on the difference between the horizontal position of the mobile object B and the horizontal position of the aerial vehicle A.

The aerial vehicle control unit 11f (see FIG. 5) calculates a command value corresponding to an angular velocity of each rotor 13 based on the difference between the current relative altitude (relative altitude calculated in S302) and the target relative altitude of the aerial vehicle A with respect to the mobile object B and the difference between the current horizontal relative position (horizontal relative position calculated in S303) and the target horizontal relative position, and outputs the calculated command value to the rotor driver 14 (S304, S305).

The control devices 11A and 11B determine whether an end condition of the following control of the aerial vehicle A for the mobile object B is satisfied (S306), and if the ending condition is not satisfied, the processing returns to S302. If the end condition is satisfied, the control devices 11A and 11B end the following control (processing performed in S302 to S305). The end condition is, for example, an input of an end instruction by the operator into the input unit 25.

[Example of Correcting Target According to Cable Tension and Angle]

As described with reference to FIGS. 7A and 7B, if the acquisition frequency of the position information based on the GPS signal is lower than the frequency required by the control of the aerial vehicle A, the mobile object altitude calculating unit 11i and the mobile object position calculating unit 11j calculate (estimate) the current altitude and horizontal position of the mobile object B based on the latest altitude and horizontal position calculated from the GPS signal and the output of the IMU 22B. However, due to the influences such as wind striking the mobile object B, a change in the accelerator operation of the mobile object B, and a change in the direction of the mobile object B, and low accuracy of the position calculated based on the GPS signal, the current altitude of the mobile object B calculated (estimated) from the GPS signal and the output of the IMU 22B may differ from the actual altitude. Further, for the same reason, the current horizontal position (latitude and longitude) of the mobile object B calculated (estimated) from the GPS signal and the output of the IMU 22B may differ from the actual horizontal position. If such a difference occurs, the target altitude and the target horizontal position of the aerial vehicle A are not set correctly.

Thus, the control devices 11A and 11B may use the tension and/or the angle of the mooring cable 32 to correct the target altitude and the target horizontal position of the aerial vehicle A. In this manner, the mooring cable 32 can compensate the low accuracy of the altitude and the horizontal position calculated using the IMU 22B. The GPS receivers 12C and 22A used in such a system may not be receivers for positioning by the RTK-GPS described above, but may be receivers (common GPS receivers) for single positioning to calculate a distance from the GPS satellite to the receiver with use of GPS signals from four or more GPS satellites.

Figure 9A:
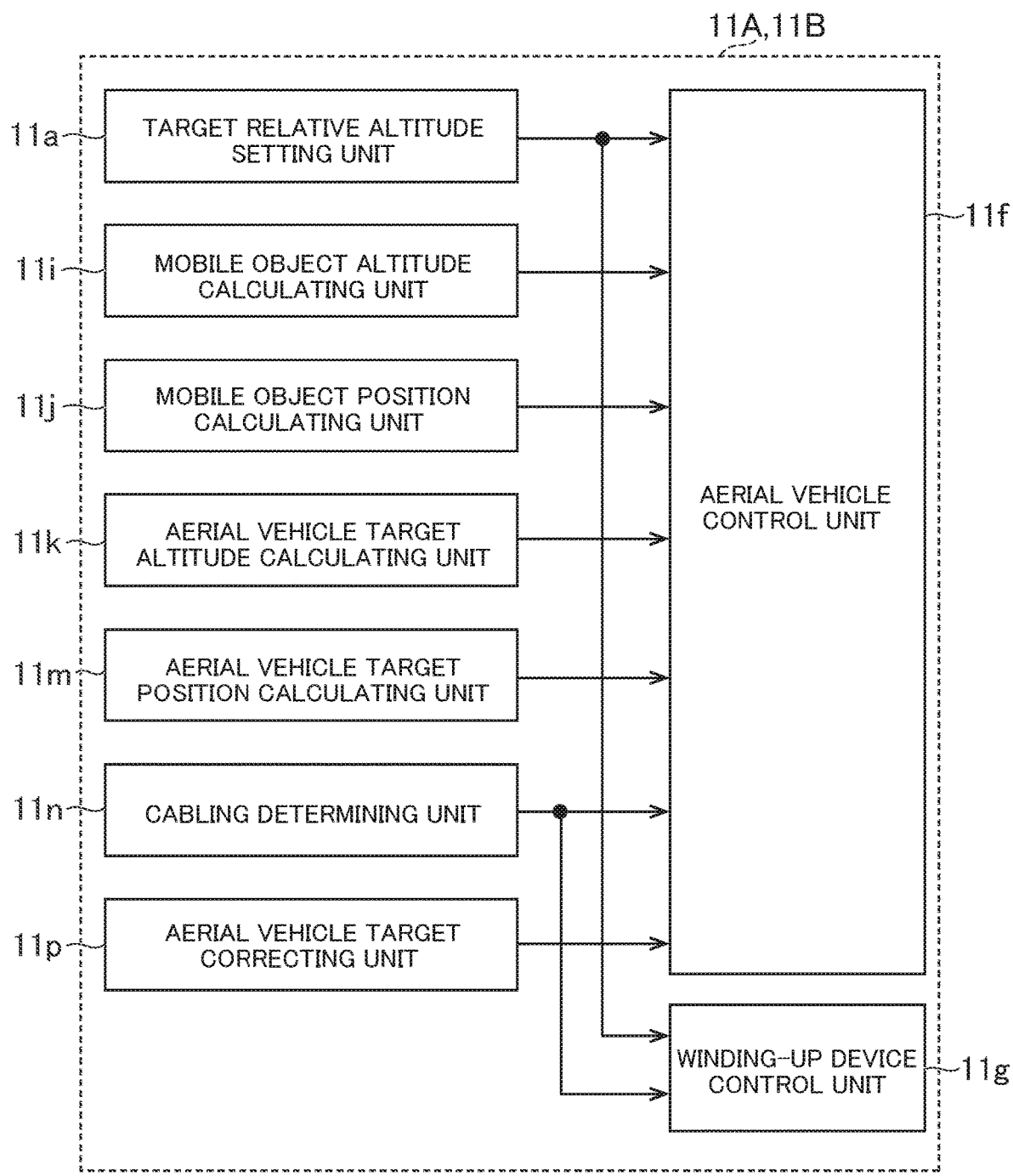
FIG. 9A is a block diagram showing functions of the control device of the unmanned aerial vehicle and the control device of the base device according to a modification. Here, an example is shown in which a target altitude of the unmanned aerial vehicle is corrected by using tension and an angle of the mooring cable.

FIG. 9A is a block diagram showing functions of the control devices 11A and 11B for executing such processing. Similarly to the example described with reference to FIG. 7A, the control devices 11A and 11B include the target relative altitude setting unit 11a, the mobile object altitude calculating unit 11i, the mobile object position calculating unit 11j, the aerial vehicle target altitude calculating unit 11k, and the aerial vehicle target position calculating unit 11m. In the control system shown in FIG. 9, the control devices 11A and 11B further include a cable determining unit 11n and an aerial vehicle target correcting unit 11p.

Similarly to the tension determining unit 11e described with reference to FIG. 5, for example, the cable determining unit 11n detects tension of the mooring cable 32 based on the output of the tension sensor 12D. Then, the cable determining unit 11n determines whether the detected tension satisfies a predetermined condition. For example, the cabling determining unit 11n determines whether the detected tension is smaller than a predetermined threshold value (upper limit value). Further, the cable determining unit $11n$ also determines whether the tension of the mooring cable 32 is greater than a predetermined threshold value (lower limit value).

The cable determining unit $11n$ calculates the angle of the mooring cable 32 using the output of the cable angle sensor 12E. The cable determining unit $11n$ determines whether the angle meets a predetermined condition. For example, the cabling determining unit $11n$ determines whether the angle is smaller than a predetermined threshold value (upper limit value). Here, the angle of the mooring cable 32 is, for example, the angle $\theta$ of the mooring cable 32 with respect to the vertical direction (see FIG. 3A).

The aerial vehicle target correcting unit $11p$ corrects the target altitude calculated in the aerial vehicle target altitude calculating unit $11k$ in accordance with the determination result of the cable determining unit $11n$. Specifically, in a case where the tension and/or the angle of the mooring cable 32 do not satisfy the predetermined condition (or the tension and/or the angle satisfy the predetermined condition), the aerial vehicle target correcting unit $11p$ corrects the calculated target altitude. The correction of the target altitude may be performed based on the tension and/or the angle of the mooring cable 32.

For example, if the tension of the mooring cable 32 is greater than the predetermined threshold value (upper limit value), the aerial vehicle target correcting unit $11p$ may reduce the target altitude of the aerial vehicle A. This loosens the tension of the mooring cable 32. At this time, the correction amount (lowering amount) of the target altitude may be determined in accordance with the tension of the mooring cable 32. For example, when the tension is greater, the correction amount (lowering amount) may be larger. In contrast, if the tension of the mooring cable 32 is smaller than the predetermined threshold value (lower limit), the aerial vehicle target correcting unit $11p$ may increase the target altitude of the aerial vehicle A. At this time, the correction amount (increasing amount) of the target altitude may be determined in accordance with the tension of the mooring cable 32.

The aerial vehicle target correcting unit $11p$ may correct the target horizontal position calculated by the aerial vehicle target position calculating unit $11m$ in accordance with the determination result of the cable determining unit $11n$. For example, if the angle of the mooring cable 32 is greater than the predetermined threshold value (upper limit value), the aerial vehicle target correcting unit $11p$ may move the target horizontal position of the aerial vehicle A in a direction in which the mooring cable 32 is inclined. As shown in FIGS. 4A and 4B, if the mooring cable 32 extends obliquely left forward from the aerial vehicle A, the aerial vehicle target correcting unit $11p$ may move the target horizontal position of the aerial vehicle A obliquely left forward. This reduces the inclination of the mooring cable 32.

Figure 9B:
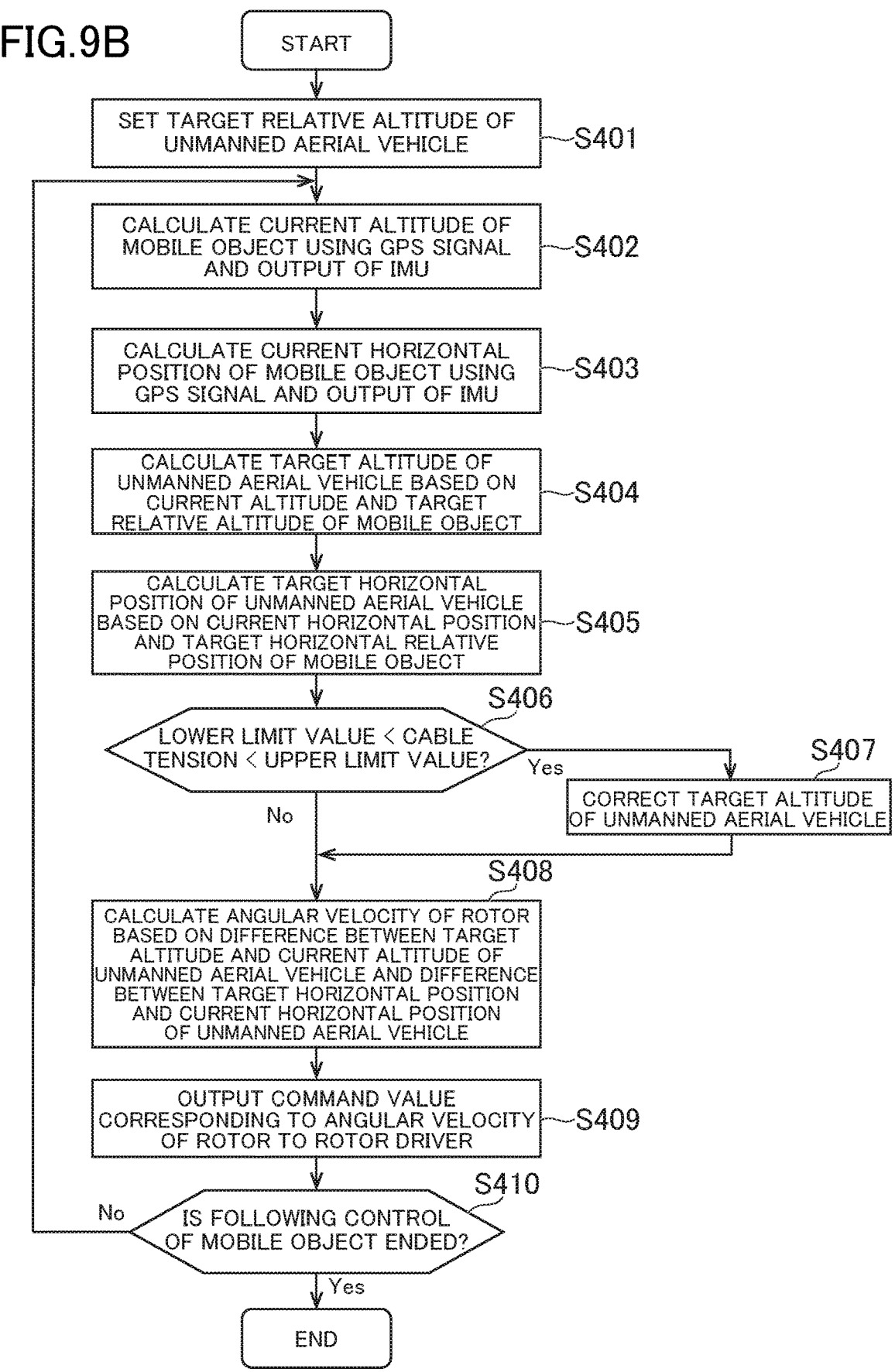
FIG. 9B is a flow chart showing the processing performed by the control device in FIG. 9A.

The processing executed by the control devices 11A and 11B for correcting the target of the aerial vehicle A in accordance with the determination result of the cable determining unit $11n$ will be described. FIG. 9B is a flow chart showing an example of the processing.

First, the target relative altitude setting unit $11a$ sets a target relative altitude (S401). In a control system where the operator can adjust not only the target relative altitude but also the target horizontal relative position, a target horizontal relative position may also be set in S401.

Next, the mobile object altitude calculating unit $11i$ calculates the altitude of the mobile object B based on the GPS signal received by the GPS receiver 22A, and uses the output of the IMU 22B to calculate the altitude in a period in which the position information based on the GPS signal is not acquired (S402). Further, the mobile object position calculating unit $11j$ calculates the horizontal position (i.e., latitude and longitude) of the mobile object B based on the GPS signal received by the GPS receiver 22A, and uses the output of the IMU 22B to calculate the horizontal position in a period in which the position information based on the GPS signal is not acquired (S403).

The aerial vehicle target altitude calculating unit $11k$ calculates a target altitude of the aerial vehicle A based on the current altitude of the mobile object B calculated in S402 and the target relative altitude set in S401 (S404). Specifically, the aerial vehicle target altitude calculating unit $11k$ may add the target relative altitude to the calculated current altitude of the mobile object B, and use the obtained value as the target altitude of the aerial vehicle A. The aerial vehicle target position calculating unit $11m$ calculates a target horizontal position (target latitude and target longitude) of the aerial vehicle A based on the calculated current horizontal position and the target horizontal relative position of the mobile object B (S405). In the control system in which the aerial vehicle A is required to be positioned directly above the mobile object B, the calculated current horizontal position of the mobile object B may be set as the target horizontal position of the aerial vehicle A.

The cable determining unit $11n$ detects the tension of the mooring cable 32 based on the output of the tension sensor 12D, and determines whether the detected tension is smaller than a predetermined threshold value (upper limit value) (S406). Further, the cable determining unit $11n$ determines whether the tension of the mooring cable 32 is greater than a predetermined threshold value (lower limit value) (S406). In S406, if the tension of the mooring cable 32 is greater than the upper limit value or smaller than the lower limit value, the aerial vehicle target correcting unit $11p$ corrects the target altitude of the aerial vehicle A calculated in S404 (S407). Specifically, if the tension of the mooring cable 32 is greater than the upper limit value, the aerial vehicle target correcting unit $11p$ may reduce the target altitude of the aerial vehicle A calculated in S404, for example. Further, if the tension of the mooring cable 32 is smaller than the lower limit value, the aerial vehicle target correcting unit $11p$ may increase the target altitude of the aerial vehicle A calculated in S404, for example.

In S406, the cable determining unit $11n$ may calculate the angle of the mooring cable 32 using the output of the cable angle sensor 12E, and determine whether the angle is smaller than a predetermined threshold value (upper limit value) (here, the angle of the mooring cable 32 is, for example, the angle $\theta$ shown in FIG. 3A). If the angle of the mooring cable 32 is greater than the threshold value (upper limit value), in S407, the aerial vehicle target correcting unit $11p$ may move the target position calculated in S405 in a direction in which the mooring cable 32 is inclined.

The aerial vehicle control unit $11f$ calculates a command value corresponding to an angular velocity of each rotor 13 based on the difference between the current altitude and the target altitude of the aerial vehicle A, and the difference between the current horizontal position and the target horizontal position of the aerial vehicle A, and outputs the command value to the rotor driver 14 (S408, S409). If the target altitude is corrected in S407, the corrected target altitude is used in S408. Similarly, if the target horizontal position is corrected in S407, the corrected target horizontal position is used in S408.

The control devices 11A and 11B determine whether an end condition of following control of the aerial vehicle A for the mobile object B is satisfied (S410), and, if the end condition is not satisfied, the processing returns to S402. If the end condition is satisfied, the control devices 11A and 11B end the following control (processing performed in S402 to S409). The end condition is, for example, an input of an end instruction by the operator into the input unit 25.

[Example of Using Barometric Altitude Sensor]

In general, an altitude detected by a barometric altitude sensor has higher accuracy than an altitude calculated based on a GPS signal. As such, the altitude of the aerial vehicle A may be controlled by using the barometric altitude sensor.

Figure 10:
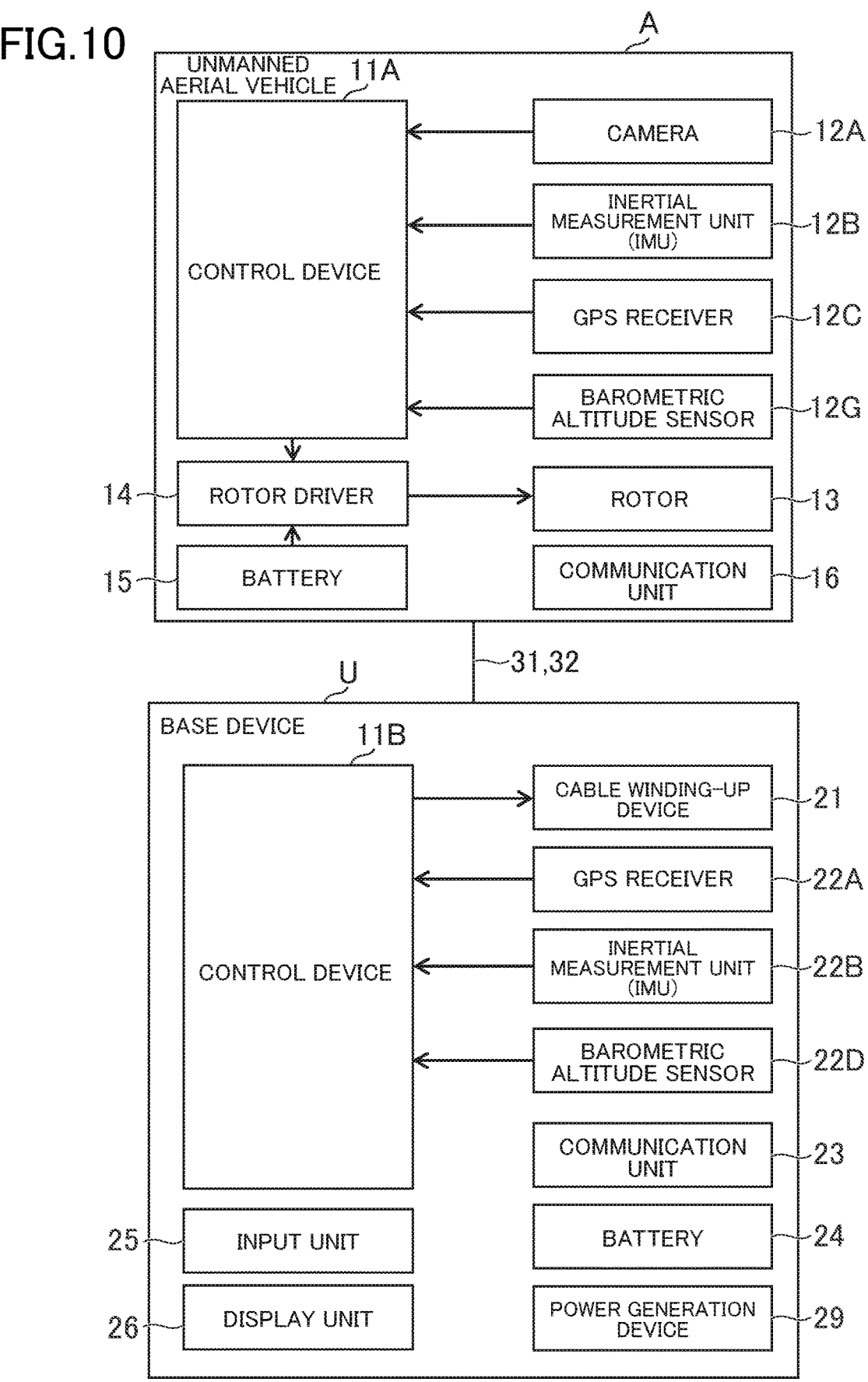
FIG. 10 is a block diagram showing hardware of the unmanned aerial vehicle and the base device according to a modification. Here, an example is shown in which a barometric altitude sensor is provided on an unmanned aerial vehicle and a base device.

FIG. 10 is a block diagram showing an example of the aerial vehicle A and the base device U having such a barometric altitude sensor. The aerial vehicle A and the base device U shown in FIG. 10 respectively include a barometric altitude sensor 12G and a barometric altitude sensor 22D. In the example shown in FIG. 10, the tension sensor 12D and the cable angle sensor 12E described above are not provided in the aerial vehicle A, although these sensors 12D and 12E may be provided in the aerial vehicle A. If the barometric altitude sensors 12G and 22D are provided in the aerial vehicle A and the mobile object B, the GPS receivers 12C and 22A may not be receivers for positioning by the RTK-GPS described above, but may be receivers for single positioning to calculate a distance from the GPS satellite to the receiver with use of the GPS signals from four or more GPS satellites.

If the barometric altitude sensors are provided in the aerial vehicle A and the base device U, the mobile object altitude calculating unit 11$i$ (see FIGS. 7A and 9A) of the control devices 11A and 11B calculates the current altitude of the mobile object B based on the output of the barometric altitude sensor 22D included in the base device U. For example, in S202 of FIG. 7B, the mobile object altitude calculating unit 11$i$ calculates the current altitude of the mobile object B based on the output of the barometric altitude sensor 22D instead of the output of the GPS receiver 22A and the output of the IMU 22B. Further, in S402 of FIG. 9B, the mobile object altitude calculating unit 11$i$ may calculate the current altitude of the mobile object B based on the output of the barometric altitude sensor 22D instead of the output of the GPS receiver 22A and the output of the IMU 22B.

In S204 of FIG. 7B, the aerial vehicle target altitude calculating unit 11$k$ (see FIGS. 7A and 9A) calculates a target altitude of the aerial vehicle A based on the current altitude of the mobile object B calculated from the output of the barometric altitude sensor 22D and the target relative altitude. Further, in S404 of FIG. 9B, the aerial vehicle target altitude calculating unit 11$k$ calculates a target altitude of the aerial vehicle A based on the current altitude of the mobile object B calculated from the output of the barometric altitude sensor 22D and the target relative altitude.

The aerial vehicle control unit 11$f$ (see FIGS. 7A and 9A) calculates the current altitude of the aerial vehicle A from the output of the barometric altitude sensor 12G provided in the aerial vehicle A. In S206 of FIG. 7B or S408 of FIG. 9B, the aerial vehicle control unit 11$f$ then calculates a command value corresponding to an angular velocity of each rotor 13 based on the difference between the current altitude and the target altitude of the aerial vehicle A, and the difference between the current horizontal position and the target horizontal position of the aerial vehicle A.

Conclusion (1) A control system 1 proposed in the present disclosure includes a base device U to be mounted on a mobile object B, an unmanned aerial vehicle A, cables 31 and 32 including a power supply cable 31 for supplying electric power from the mobile object B to the aerial vehicle A and connecting the base device U with the aerial vehicle A, and control devices 11A and 11B that control flight of the aerial vehicle A. The control devices 11A and 11B control the unmanned aerial vehicle A so that a relative altitude of the unmanned aerial vehicle A with respect to the mobile object B matches a target relative altitude. This control system 1 optimizes an altitude of the aerial vehicle A in accordance with the mobile object B. For example, the altitude of the aerial vehicle A can be moved up and down in accordance with the movement of the mobile object B.

(2) As shown in FIG. 2A, in an example of the control system 1, the aerial vehicle A includes a sensor 12E for detecting an angle of the mooring cable 32. The control devices 11A and 11B calculate the relative altitude of the aerial vehicle A with respect to the mobile object B based on the angle of the mooring cable 32.

(3) As shown in FIG. 2A, in an example of the control system 1, the aerial vehicle A includes a sensor 12E for detecting tension of the mooring cable 32. In a case where the tension of the mooring cable 32 is lower than a threshold value, the control devices 11A and 11B control the unmanned aerial vehicle A so as to increase a distance between the unmanned aerial vehicle A and the base device U. This system reduces deflection of the mooring cable 32 and improves calculation accuracy of the relative altitude.

(4) As shown in FIG. 5, in an embodiment of the control system 1, the control devices 11A and 11B include a relative altitude calculating unit 11$b$ that calculates the relative altitude of the aerial vehicle A with respect to the mobile object B, and controls the unmanned aerial vehicle so that the calculated relative altitude matches the target relative altitude.

(5) As shown in FIG. 8A, in an example of the control system 1, the aerial vehicle A includes a camera 12F for capturing the mobile object B. The control devices 11A and 11B use an image captured by the camera 12F to calculate the relative altitude of the aerial vehicle with respect to the mobile object B.

(6) The control system 1 includes a GPS receiver 22A (see FIG. 2B) mounted on the mobile object B and a GPS receiver 12C (see FIG. 2A) mounted on the aerial vehicle A. In the examples shown in FIGS. 7A and 7B, the control devices 11A and 11B use an altitude of the mobile object B obtained from an output of the GPS receiver 22A and an altitude of the aerial vehicle A obtained from an output of the second GPS receiver 12C to control the aerial vehicle A so that the relative altitude of the aerial vehicle A with respect to the mobile object B matches the target relative altitude.

(7) The base device U includes an inertial measurement unit 22B mounted on the mobile object B. In the examples shown in FIGS. 7A and 7B and examples shown in FIGS. 9A and 9B, the control devices 11A and 11B may calculate the altitude of the mobile object B based on a signal obtained by the GPS receiver 22A and an output of the inertial measurement unit 22B. This enables a detection of the altitude of the mobile object B with high accuracy, thereby improving accuracy of control of the aerial vehicle A.

(8) In the examples shown in FIGS. 7A and 7B and examples shown in FIGS. 9A and 9B, the control devices 11A and 11B complement the altitude based on the output of the inertial measurement unit 22B during a period in which a signal is not received by the GPS receiver 22A. That is, the control devices 11A and 11B calculate the altitude of the mobile object B based on the output of the inertial measurement unit 22B during a period between a first time at which the GPS receiver 22A obtains a first signal and a second time at which the GPS receiver 22A obtains a second signal, the second signal being the next signal after the first signal.

(9) In the example shown in FIG. 10, the barometric altitude sensor 22D is mounted on the mobile object B, and the barometric altitude sensor 12G is mounted on the aerial vehicle A. The control devices 11A and 11B use an altitude of the mobile object B calculated from an output of the barometric altitude sensor of the mobile object B and an altitude of the unmanned aerial vehicle A calculated from an output of the barometric altitude sensor 12G to control the aerial vehicle A so that the relative altitude of the aerial vehicle A with respect to the mobile object B matches the target relative altitude. This improves the accuracy of the control of the unmanned aerial vehicle A.

(10) In the example shown in FIGS. 7A and 7B and example shown in FIGS. 9A and 9B, the control devices 11A and 11B include a mobile object altitude calculating unit 11i that calculates a current altitude of the mobile object B and an aerial vehicle target altitude calculating unit 11k that calculates a target altitude of the aerial vehicle A based on the current position of the mobile object B and the target relative altitude, and controls the aerial vehicle A so that a current altitude of the aerial vehicle A matches the target altitude.

(11) In the example shown in FIGS. 9A and 9B, the control devices 11A and 11B include a cable determining unit 11n that determines whether tension acting on the mooring cable 32 satisfies a predetermined condition and/or whether an angle of the mooring cable 32 satisfies a predetermined condition. The control devices 11A and 11B correct the target altitude of the aerial vehicle A in accordance with a determination result of the cable determining unit 11n. This allows the altitude of the aerial vehicle A to follow the movement of the mobile object B in a more stable manner.

(12) In the example shown in FIGS. 9A and 9B, the control devices 11A and 11B include an aerial vehicle target altitude calculating unit 11k that calculates a target altitude of the aerial vehicle A, a cable determining unit 11n that determines whether tension acting on the mooring cable 32 is greater than a threshold value and/or whether an angle of the mooring cable 32 is greater than a threshold value, and an aerial vehicle target correcting unit 11p that corrects the target altitude of the aerial vehicle A based on a determination result of the cable determining unit 11n. According to this example, the relative altitude between the mobile object B and the aerial vehicle A can be appropriately maintained.

(13) In the control method proposed in the present disclosure, the aerial vehicle A is controlled so that the target relative altitude of the aerial vehicle A with respect to the mobile object B is determined and the relative altitude of the aerial vehicle A with respect to the mobile object B matches the target relative altitude. This control method optimizes an altitude of the aerial vehicle A in accordance with the mobile object B. For example, the altitude of the aerial vehicle A can be moved up and down in accordance with the movement of the mobile object B.

(14) In the control method proposed in the present disclosure, as described in FIGS. 9A and 9B, the target altitude of the aerial vehicle A is calculated, and whether the tension acting on the mooring cable 32 satisfies a predetermined condition and/or whether the angle of the mooring cable 32 satisfies a predetermined condition is determined. The target altitude of the aerial vehicle A is then corrected according to the determination result. According to this control method, the relative altitude between the mobile object B and the aerial vehicle A can be appropriately maintained.

The control system proposed in the present disclosure is not limited to the examples described above. For example, a feature described in one example may be applied in other examples. For example, the cable determining unit 11n and the aerial vehicle target correcting unit 11p may be used not only in the control system described in FIGS. 9A and 9B but also in the system utilizing the barometric altitude sensor described with reference to FIG. 10 or the system utilizing the camera 12F described with reference to FIGS. 8A and 8B.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An unmanned aerial vehicle control system, comprising:
   an unmanned aerial vehicle;
   a base device to be mounted on a mobile object;
   at least one cable including a power supply cable connecting the base device with the unmanned aerial vehicle, the power supply cable supplying electric power from the mobile object to the unmanned aerial vehicle; and
   a control device that controls flight of the unmanned aerial vehicle, wherein
   the control device controls the unmanned aerial vehicle so that a relative altitude of the unmanned aerial vehicle with respect to the mobile object matches a target relative altitude,
   wherein the control device includes a relative altitude calculating unit that calculates the relative altitude of the unmanned aerial vehicle, and controls the unmanned aerial vehicle so that the calculated relative altitude matches the target relative altitude.

2. The unmanned aerial vehicle control system according to claim 1, further comprising a sensor that detects an angle of the at least one cable, wherein
   the control device calculates the relative altitude of the unmanned aerial vehicle with respect to the mobile object based on the angle of the at least one cable.

3. An unmanned aerial vehicle control system, comprising:
   an unmanned aerial vehicle;
   a base device to be mounted on a mobile object;
   at least one cable including a power supply cable connecting the base device with the unmanned aerial vehicle, the power supply cable supplying electric power from the mobile object to the unmanned aerial vehicle; and a control device that controls flight of the unmanned aerial vehicle, wherein the control device controls the unmanned aerial vehicle so that a relative altitude of the unmanned aerial vehicle with respect to the mobile object matches a target relative altitude, further comprising a sensor that detects tension of the at least one cable, wherein in a case where the tension of the at least one cable is lower than a threshold value, the control device controls the unmanned aerial vehicle so as to increase a distance between the unmanned aerial vehicle and the base device.

4. The unmanned aerial vehicle control system according to claim 1, further comprising a camera that is mounted on the mobile object so as to capture the unmanned aerial vehicle, wherein the control device uses an image captured by the camera to calculate the relative altitude of the unmanned aerial vehicle with respect to the mobile object.

5. The unmanned aerial vehicle control system according to claim 1, further comprising:

a first GPS receiver mounted on the mobile object; and a second GPS receiver mounted on the unmanned aerial vehicle, wherein the control device uses an altitude of the mobile object obtained from an output of the first GPS receiver and an altitude of the unmanned aerial vehicle obtained from an output of the second GPS receiver to control the unmanned aerial vehicle so that the relative altitude of the unmanned aerial vehicle with respect to the mobile object matches the target relative altitude.

6. The unmanned aerial vehicle control system according to claim 5, further comprising an inertial measurement unit mounted on the mobile object, wherein the control device calculates the altitude of the mobile object based on a signal obtained by the first GPS receiver and an output of the inertial measurement unit.

7. The unmanned aerial vehicle control system according to claim 6, wherein the control device calculates the altitude of the mobile object based on the output of the inertial measurement unit during a period between a first time at which the first GPS receiver obtains a first signal and a second time at which the first GPS receiver obtains a second signal, the second signal being the next signal after the first signal.

8. The unmanned aerial vehicle control system according to claim 1, further comprising:

a first barometric altitude sensor mounted on the mobile object, and a second barometric altitude sensor mounted on the unmanned aerial vehicle, wherein the control device uses an altitude of the mobile object calculated from an output of the first barometric altitude sensor and an altitude of the unmanned aerial vehicle calculated from an output of the second barometric altitude sensor to control the unmanned aerial vehicle so that the relative altitude of the unmanned aerial vehicle with respect to the mobile object matches the target relative altitude.

9. An unmanned aerial vehicle control system, comprising:

an unmanned aerial vehicle;

a base device to be mounted on a mobile object;

at least one cable including a power supply cable connecting the base device with the unmanned aerial vehicle, the power supply cable supplying electric power from the mobile object to the unmanned aerial vehicle; and a control device that controls flight of the unmanned aerial vehicle, wherein the control device controls the unmanned aerial vehicle so that a relative altitude of the unmanned aerial vehicle with respect to the mobile object matches a target relative altitude, wherein the control device includes a mobile object altitude calculating unit that calculates a current altitude of the mobile object and an aerial vehicle target altitude calculating unit that calculates a target altitude of the unmanned aerial vehicle based on the current altitude of the mobile object and the target relative altitude, and controls the unmanned aerial vehicle so that a current altitude of the unmanned aerial vehicle matches the target altitude.

10. The unmanned aerial vehicle control system according to claim 9, wherein the control device includes a cable determining unit that determines whether tension acting on the at least one cable is greater than a threshold value and/or whether an angle of the at least one cable is greater than a threshold value, and the control device corrects the target altitude of the unmanned aerial vehicle in accordance with a determination result of the cable determining unit.

11. An unmanned aerial vehicle control system comprising:

a base device to be mounted on a mobile object;

an unmanned aerial vehicle;

at least one cable including a power supply cable connecting the base device with the unmanned aerial vehicle, the power supply cable supplying electric power from the mobile object to the unmanned aerial vehicle; and a control device that controls flight of the unmanned aerial vehicle, wherein the control device includes:

an aerial vehicle target altitude calculating unit that calculates a target altitude of the unmanned aerial vehicle;

a cable determining unit that determines whether tension acting on the at least one cable satisfies a predetermined condition and/or whether an angle of the at least one cable satisfies a predetermined condition; and an aerial vehicle target correcting unit that corrects the target altitude of the unmanned aerial vehicle based on a determination result of the cable determining unit.

12. An unmanned aerial vehicle control method for controlling an unmanned aerial vehicle that is connected to a base device to be mounted on a mobile object through at least one cable including a power supply cable, the method comprising:

determining a target relative altitude of the unmanned aerial vehicle with respect to the mobile object; and controlling the unmanned aerial vehicle so that a relative altitude of the unmanned aerial vehicle with respect to the mobile object matches the target relative altitude, calculating the relative altitude of the unmanned aerial vehicle, and controlling the unmanned aerial vehicle so that the calculated relative altitude matches the target relative altitude.

13. An unmanned aerial vehicle control method for controlling an unmanned aerial vehicle that is connected to a base device to be mounted on a mobile object through at least one cable including a power supply cable, the method comprising:
- a calculating step of calculating a target altitude of the unmanned aerial vehicle;
- a cable determining step of determining whether tension acting on the at least one cable satisfies a predetermined condition and/or whether an angle of the at least one cable satisfies a predetermined condition; and
- a correcting step of correcting the target altitude of the unmanned aerial vehicle in accordance with a determination result in the cable determining step.

14. The unmanned aerial vehicle control system according to claim 1, further comprising a camera that is mounted on the unmanned aerial vehicle so as to capture the mobile object, wherein
the control device uses an image captured by the camera to calculate the relative altitude of the unmanned aerial vehicle with respect to the mobile object.

\* \* \* \* \*